(12) United States Patent
Davijani et al.

(10) Patent No.: US 10,364,333 B2
(45) Date of Patent: Jul. 30, 2019

(54) ORDERED WRAPPING OF POLY(METHYL METHACRYLATE) ON SINGLE WALL CARBON NANOTUBES

(71) Applicant: Georgia Tech Research Corporation, Atlanta, GA (US)

(72) Inventors: Amir Ahmad Bakhtiary Davijani, Atlanta, GA (US); Satish Kumar, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/435,292

(22) Filed: Feb. 16, 2017

(65) Prior Publication Data

US 2017/0298208 A1 Oct. 19, 2017

Related U.S. Application Data

(60) Provisional application No. 62/292,541, filed on Feb. 16, 2016.

(51) Int. Cl.
| | |
|---|---|
| *C08K 3/04* | (2006.01) |
| *C01B 32/158* | (2017.01) |
| *C01B 32/159* | (2017.01) |
| *C01B 32/172* | (2017.01) |
| *D21H 13/50* | (2006.01) |
| *D01F 9/12* | (2006.01) |
| *C01B 32/168* | (2017.01) |

(Continued)

(52) U.S. Cl.
CPC ............ *C08K 3/041* (2017.05); *C01B 32/168* (2017.08); *C01B 32/174* (2017.08); *D01F 9/12* (2013.01); *D21H 13/50* (2013.01); *D21H 15/02* (2013.01); *D21H 15/12* (2013.01); *D21H 21/52* (2013.01); *C01B 32/158* (2017.08); *C01B 32/159* (2017.08); *C01B 32/172* (2017.08); *C01B 2202/02* (2013.01); *C01B 2202/32* (2013.01)

(58) Field of Classification Search
None
See application file for complete search history.

(56) References Cited

U.S. PATENT DOCUMENTS

| 7,264,876 B2 | 9/2007 | Smalley et al. | |
|---|---|---|---|
| 2002/0046872 A1* | 4/2002 | Smalley ................. | B82Y 10/00 174/137 A |

(Continued)

OTHER PUBLICATIONS

Bakhtiary, A. et al., "Ordered wrapping of poly(methyl methacrylate) on single wall carbon nanotubes". Polymer 2015, 70, 278-281 (Year: 2015).*

(Continued)

*Primary Examiner* — Richard A Huhn
(74) *Attorney, Agent, or Firm* — Troutman Sanders LLP; Ryan A. Schneider

(57) ABSTRACT

Carbon nanotubes (CNTs) exhibit high electrical and thermal conductivity and good mechanical properties, making them suitable fillers for composites. Their effectiveness as a filler is affected by their state of aggregation. Novel ordered helical wrapping of poly (methyl methacrylate) (PMMA) has been achieved on single wall carbon nanotubes (SWNTs). This carbon nanotube composite not only thwarts CNT aggregation, but also may be successfully leveraged for applications such as electrical energy storage and mechanical reinforcement.

19 Claims, 16 Drawing Sheets

(51) Int. Cl.
  D21H 15/02    (2006.01)
  D21H 15/12    (2006.01)
  D21H 21/52    (2006.01)
  C01B 32/174   (2017.01)

(56) References Cited

U.S. PATENT DOCUMENTS

2003/0122111 A1* 7/2003 Glatkowski ............ B82Y 10/00
                                                  252/500
2010/0080975 A1* 4/2010 Liang .................... B82Y 15/00
                                                  428/292.1

OTHER PUBLICATIONS

Gigliotti, B. et al., "Sequence-Independent Helical Wrapping of Single-Walled Carbon Nanotubes by Long Genomic DNA". Nano Letters 2006, 6(2), 159-164. (Year: 2006).*

Polymer Nanotube Nanocomposites: Synthesis, Properties, and Applications. Vikas Mittal, ed. John Wiley & Sons, Dec. 14, 2010. (Year: 2010).*

Luo, et al. "Comparison of Ultrasonication and Microfluidization for High Throughput and Large-scale Processing SWCNT Dispersons," Carbon, 2010. 48(10) p. 2991394.

Badaire, et al. "In Situ Measurements of Nanotube Dimensions in Suspensions by Depolarized Dynamic Light Scattering," Langmuir, 2004. 20(24) pp. 10367-10370.

Haggenmueller, et al., "Aligned Single-Wall Carbon Nanotubes in Composites by Melt Processing Methods," Chemical Physics Letters, 2000. 330(3-4): pp. 219-225.

Rastogi, et al., "Comparative Study of Carbon Nanotube Dispersion Using Surfactants," Journal of Colloid and Interface Science, 2008. 328(2): pp. 421-428.

Star, et al, "Preparation and Properties of Polymer-Wrapped Single-Walled Carbon Nanotubes," Angewandte Chemie International Edition 2001 40(9); pp. 1721-1725.

Tang, et al., "Preparation, Alignment and Optical Properties of Soluble Poly(phenylacetylene)—Wrapped Carbon Nanotubes," Macromolecules, 1999. 32(8) pp. 2569-2576.

* cited by examiner

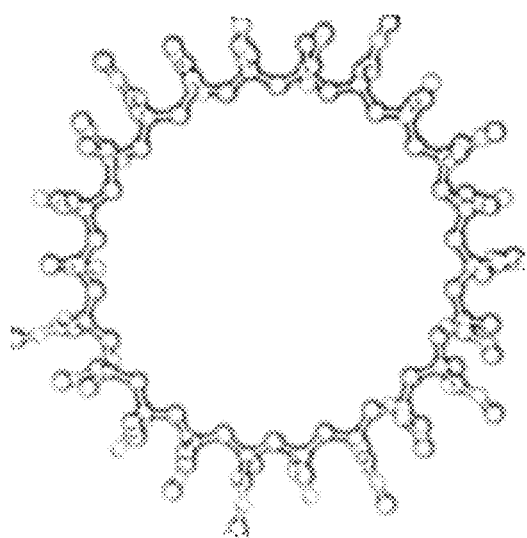 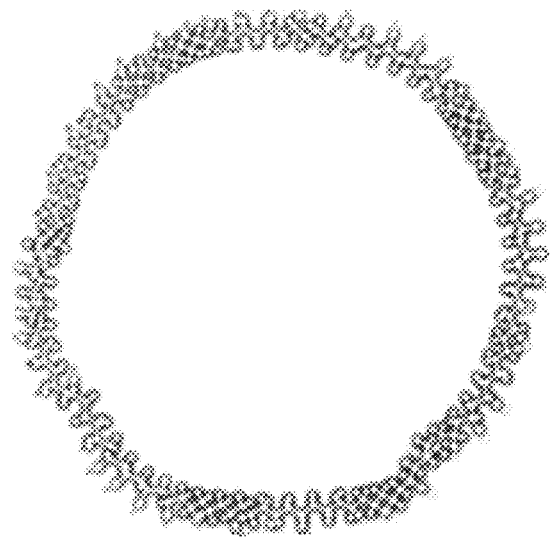
FIG. 1A
FIG. 1B

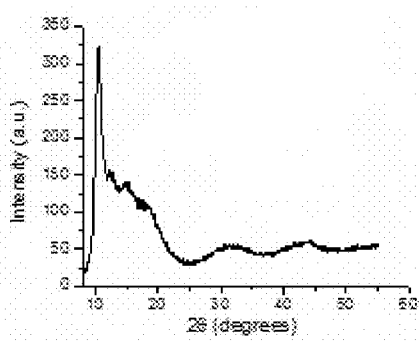
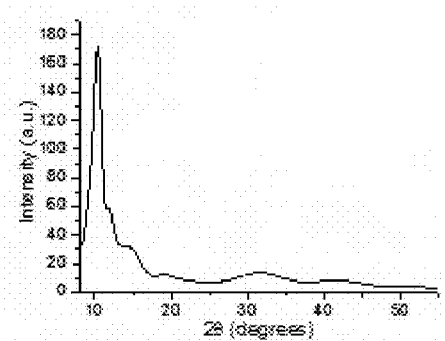
FIG. 9A　　　　　　　　　　　FIG. 9B
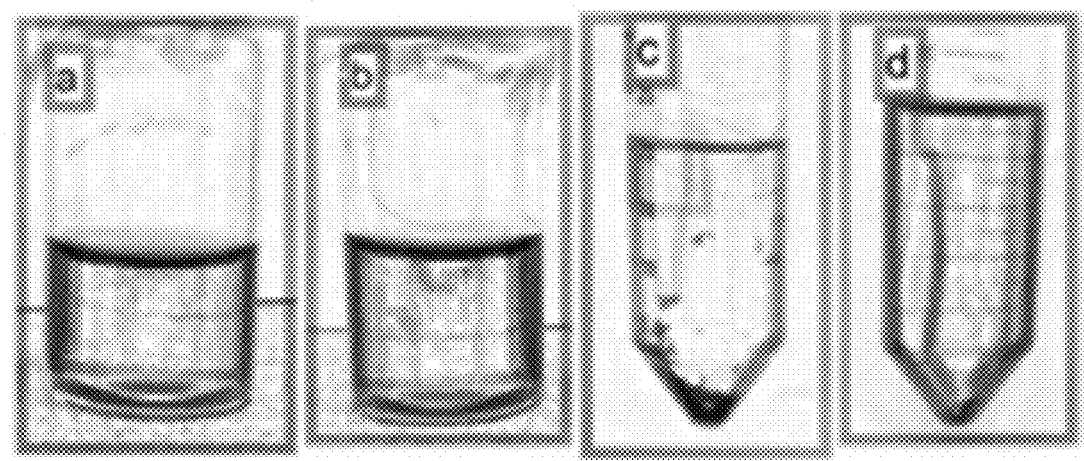
FIG. 10A　　　FIG. 10B　　　FIG. 10C　　　FIG. 10D

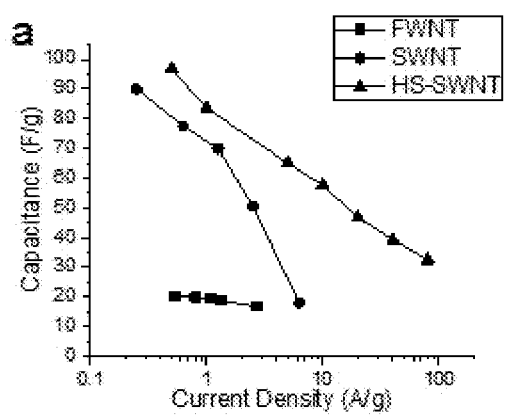 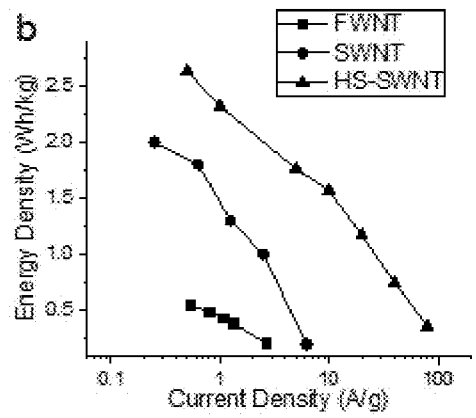
FIG. 16A    FIG. 16B
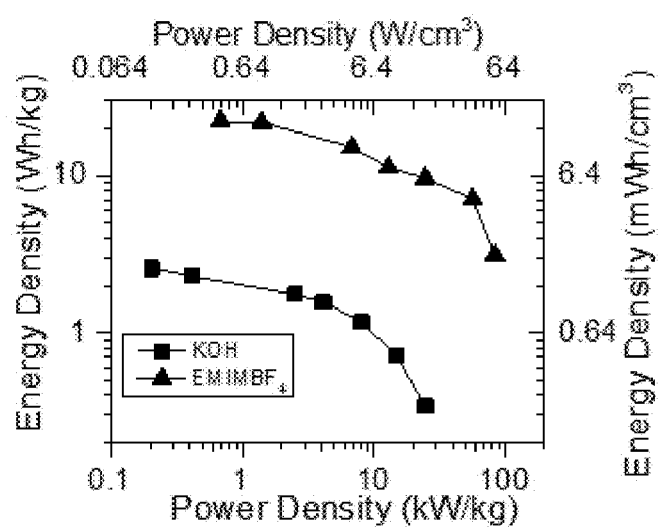
FIG. 17

ORDERED WRAPPING OF POLY(METHYL METHACRYLATE) ON SINGLE WALL CARBON NANOTUBES

CROSS-REFERENCE TO RELATED APPLICATION

This application claims the benefit of application No. 62/295,541, filed Feb. 16, 2016, the entire contents and substance of which are hereby incorporated by reference.

STATEMENT REGARDING FEDERALLY SPONSORED RESEARCH

This invention was made with government support under grant number FA9550-14-1-0194 awarded by the United States Air Force Office of Scientific Research. The government has certain rights in the invention.

TECHNICAL FIELD

The present invention relates generally to composites and methods related to carbon nanotubes wrapped with a polymer. More particularly, the invention relates to ordered wrapping of poly(methyl methacrylate) (PMMA) on single wall carbon nanotubes (SWNTs) and methods producing same. The invention further relates to buckypaper produced with PMMA-wrapped SWNTs, as well as films and fibers produced utilizing PMMA-wrapped SWNTs.

BACKGROUND

Carbon is a very versatile element; its compounds are the basis of life on Earth, hydrocarbons are by far the most common source of fuel, and the properties of its allotropes vary widely. Carbon allotropes include graphite, diamond, amorphous carbon, C60 and carbon nanotubes.

Carbon nanotubes (CNTs) have received a lot of attention since their discovery due to their electrical, mechanical, optical and thermal properties. Carbon nanotubes can be utilized in different ways, as filler materials, such as in nanocomposites and fibers, or in freestanding form, macroscopic CNT wafers (also known as buckypapers or CNT mats) and CNT fibers. Carbon nanotubes tend to aggregate due to the van der Waals force between them. This limits their applicability as functional fillers in other materials or as free standing CNT films. Improving the dispersion of CNTs in composites has always been a challenge. Due to aggregation, they typically form bundles, and the bundles form globules, which is typically detrimental for the intended functional properties of the composite, such as electrical conductivity, mechanical, magnetic and optical properties. For electrical conductivity, aggregation increases the percolation threshold and may even prevent conductivity at higher CNT content.

Various solvents, surfactants, and processing techniques have been studied to improve CNT dispersion in polymers. While some solvents have been shown to be more effective in dispersing nanotubes, such as nitromethane and DMF, others, such as toluene and methyl ethyl ketone are not as good. Liu, J., T. Liu, and S. Kumar, *Effect of solvent solubility parameter on SWNT dispersion in PMMA*. Polymer, 2005. 46(10): p. 3419-3424. The solvent-CNT interaction plays an important role in the dispersion of the CNTs, with a better interaction leading to less aggregation of the nanotubes. Dispersing CNTs can be done in several ways. Depending on the dispersing media, solvent or polymer, different approaches can be used. In solvents, sonication, homogenization and microfluidization have been shown to be effective to disperse nanotubes. Luo, S., T. Liu, and B. Wang, *Comparison of ultrasonication and micro fluidization for high throughput and large-scale processing of SWCNT dispersions*. Carbon, 2010. 48(10): p. 2991394; Badaire, S., P. Poulin, M. Maugey, and C. Zakri, *In Situ Measurements of Nanotube Dimensions in Suspensions by Depolarized Dynamic Light Scattering*. Langmuir, 2004. 20(24): p. 10367-10370. These methods shear, cut and debundle nanotubes, resulting in smaller bundles and mostly shorter nanotubes. However, after debundling, the nanotubes are free to bundle again and form aggregates. To prevent re-aggregation, surfactants are added to the suspension. These surfactants have hydrophilic and hydrophobic ends and facilitate suspending CNTs in less favorable solvents, such as water. The hydrophobic end interacts with the CNTs while the hydrophilic tail interacts with water for dissolution. Rastogi et al. investigated four different types of surfactants, Triton X-100, sodium dodecylsulfate (SDS), Tween 20, and Tween 80, with CNTs, concluding that Triton X-100 is the most effective between them, resulting in bundle size as small as 4 nm, without specifying the number of walls and outer diameter of the carbon nanotubes. Rastogi, R., R. Kaushal, S. K. Tripathi, A. L. Sharma, I. Kaur, and L. M. Bharadwaj, *Comparative study of carbon nanotube dispersion using surfactants*. Journal of Colloid and Interface Science, 2008. 328(2): p. 421-428.

Polymers have also been used to improve CNT dispersions. Star et al. used the rigid polymer poly(metaphenylenevinylene) (PmPV) to improve SWNT dispersion in DMF. Star, A., J. F. Stoddart, D. Steuerman, M. Diehl, A. Boukai, E. W. Wong, X. Yang, S.-W. Chung, H. Choi, and J. R. Heath, *Preparation and Properties of Polymer-Wrapped Single-Walled Carbon Nanotubes*. Angewandte Chemie International Edition, 2001. 40(9): p. 1721-1725. The polymers that have been shown to wrap on carbon nanotubes include 9,9-dioctylfluorene derivatives, polyvinyl pyrrolidone, polystyrene sulfonate, DNA, polybenzimidazole (PBI), aromatic polyimide, poly[(m-phenylenevinylene)-alt-(p-phenylenevinylene)] (PmPV). It was found that as the polymer concentration was increased, the dispersion improved, from an average bundle diameter of 7.1 nm to 3.2 nm using atomic force microscopy (AFM), and the bundle diameter distribution narrowed down, indicating that the polymer had wrapped bundles, not individual CNTs.

Dispersing CNTs in many polymers including poly (methyl methacrylate) (PMMA) has been extensively studied. Considering CNT/PMMA nanocomposite, some studies have suggested different methods to improve CNT dispersion in the matrix. One study reported improvement of the dispersion by melt mixing solvent-casted multi wall carbon nanotube (MWNT)/PMMA films, after several steps of melting and drying as evidenced by optical micrographs; even after 20 melting cycles still some particles existed. Haggenmueller, R., H. H. Gommans, A. G. Rinzler, J. E. Fischer, and K. I. Winey, *Aligned single-wall carbon nanotubes in composites by melt processing methods*. Chemical Physics Letters, 2000. 330(3-4): p. 219-225. Other studies have suggested functionalization of carbon nanotubes with nitric, sulfuric acid or hydrofluoric acid, or introducing functional groups such as carboxyl, hydroxyl or carbonyl on the sidewall of CNTs which in turn improve the interaction between CNTs and different polymers.

Another approach is in-situ polymerization of polymers with CNTs. In this process the monomers and CNTs are added to the solvent along with initiators. The initiator can open π-bonds of the CNTs, hence chemically connecting the CNTs with polymer chains. These studies generally rely on TEM, SEM, rheological and optical measurements to conclude better dispersion. The in-situ polymerization technique is particularly effective for the preparation of thermally unstable and insoluble polymers, which cannot be processed by melt or solution processing. While in-situ polymerization of polymers with SWNTs leads to a better dispersion, this does not mean the nanotubes have been completely individualized. Though generally the tensile properties improve with this method due to improved dispersion and adhesion, reduction in tensile properties has also been reported.

Helical wrapping of polymers has been suggested as early as 1998. Tang, B. Z. and H. Xu, *Preparation, Alignment, and Optical Properties of Soluble Poly(phenylacetylene)-Wrapped Carbon Nanotubes*. Macromolecules, 1999. 32(8): p. 2569-2576. While several experimental studies report polymer wrapping on SWNT and/or MWNT, they do not provide evidence of ordered polymer wrapping. The only evidence which pertains to ordered polymer wrapping on carbon nanotubes, to date, comes from computational studies.

Evidence of ordered helical PMMA wrapping on CNTs has never been reported. The only account of ordered helical wrapping is of wrapping of syndiotactic PMMA (st-PMMA) around C60. X-ray diffraction showed an ordered structure of st-PMMA around the buckyballs. The helical pitch of PMMA was ~0.9 nm, with the possibility to incorporate larger buckyballs, C70 and C84 with slight alteration of the helical pitch. Syndiotactic PMMA has also been shown to crystallize using solvent-induced crystallization with a helical pitch of 0.885 nm. But there has been no report of atactic PMMA crystallization or helical wrapping.

BRIEF SUMMARY

All patents, applications, publications, test methods, literature, and other materials cited herein are hereby incorporated by reference in their entirety as if physically present in this specification.

Disclosed embodiments provide composites and methods related to carbon nanotubes wrapped with a polymer. In some embodiments carbon nanotubes are wrapped with a polymer wherein said polymer is wrapped on said carbon nanotube as an ordered helix.

Consistent with the disclosed embodiments are single wall carbon nanotube composites comprising single wall carbon nanotubes wrapped with a polymer wherein said polymer is wrapped on said carbon nanotube as an ordered helix. In further embodiments, the polymer wrapped on the carbon nanotube is poly (methyl methacrylate) (PMMA). In still further embodiments, the polymer wrapped on the carbon nanotube is atactic poly (methyl methacrylate) (PMMA).

Also consistent with the disclosed embodiments is buckypaper comprising carbon nanotubes wherein a polymer is wrapped on said carbon nanotubes as an ordered helix. In some embodiments, the carbon nanotubes comprise single wall carbon nanotubes. In further embodiments, the polymer wrapped on the carbon nanotube is poly (methyl methacrylate) (PMMA). In still further embodiments, the polymer wrapped on the carbon nanotube is atactic poly (methyl methacrylate) (PMMA).

Further consistent with the disclosed embodiments, are methods of preparing buckypaper comprising polymer-wrapped carbon nanotubes, wherein said polymer is wrapped on said carbon nanotube as an ordered helix, comprising the steps of: (a) suspending carbon nanotubes in a solvent to form a homogenized carbon nanotube/solvent suspension; (b) adding PMMA to the carbon nanotube suspension of step (a) to form a PMMA/carbon nanotube/solvent suspension; (c) sonicating the suspension of step (b); (d) filtering the suspension of step (c); and (e) washing and drying the filtrate of step (d) to produce the macroscopic aggregate of polymer-wrapped carbon nanotubes.

Still further consistent with the disclosed embodiments is a film comprising a carbon nanotube wrapped with a polymer wherein said polymer is wrapped on said carbon nanotube as an ordered helix.

Also consistent with the disclosed embodiments is a fiber comprising a carbon nanotube wrapped with a polymer wherein said polymer is wrapped on said carbon nanotube as an ordered helix.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying Figures, which are not necessarily drawn to scale, and wherein:

FIGS. 1A-B depict an exemplary embodiment of the hole diameter created by helical PMMA.

FIGS. 9A-B depict an exemplary embodiment of a comparison of theoretical and calculated X-ray diffraction.

FIGS. 10A-D depict an exemplary embodiment showing an example of PMMA/SWNT dispersion stability.

FIGS. 16A-B depict an exemplary embodiment of data showing high energy storage capability.

FIG. 17 depicts an exemplary embodiment of data showing high energy storage capability.

DETAILED DESCRIPTION

Figure 2A:
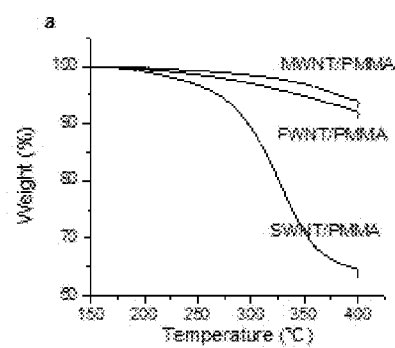
FIGS. 2A-B depict an exemplary embodiment of data showing complete PMMA removal.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Therefore, specific structural and functional details disclosed herein are not to be interpreted as limiting, but merely as a representative basis for teaching one skilled in the art to variously employ the present invention.

Previous attempts to wrap CNTs with polymers are discussed above. While some rigid polymers were shown to interact with CNTs no evidence of improvement of dispersion was provided. Other methods such as CNT functionalization and in-situ polymerization improve the interaction between CNTs and solvent or matrix material at the cost of altering the mechanical and electronic properties of the nanotubes and may not be very effective. The use of surfactants may not be possible in some cases, such as incompatibility with other components and can negatively impact desirable properties, e.g. mechanical properties. Also a high quantity of surfactants is usually required to achieve a good dispersion in a solvent. For these reasons an approach is required which prevents bundling and aggregation of nanotubes in the solvent and different polymer matrices, at low weight percent.

This application discloses a novel process that prevents CNT aggregation and novel materials and composites based on CNTs. Ordered helical wrapping of poly (methyl methacrylate) (PMMA) has been achieved on single wall carbon nanotubes (SWNTs). The PMMA wrapping not only increases the suspendability of SWNTs in solvents from 0.014 mg/mL to more than 1 mg/mL, but also improves the suspension stability over the period of several months as compared to days for sonicated SWNTs without PMMA wrapping. PMMA wrapped SWNT dispersions in dimethylformamide (DMF) are found to be stable for over three months at room temperature.

Molecular dynamics was used to identify polymers which may wrap CNTs. ChemBio 3D was used to carry out simulations. The difference between the bond angles determines the curvature and ultimately the diameter of the helix the polymer makes. Poly (methyl methacrylate) (PMMA) and polyacrylonitrile (PAN) are used to demonstrate the effect of side groups on the bond angles of the polymer backbone. A complete helix turn for each polymer is shown in FIGS. 1A-B. The diameter of PMMA is shown in FIG. 1A and the diameter of PAN when the chain is in trans configuration, is shown in FIG. 1B. The diameter of the helix created by these two polymers is ~1.6 and ~6 nm for PMMA and PAN, respectively.

The diameter of the PMMA helix is ~1.6 nm and PAN helix is ~6 nm. Considering a van der Waals distance of 0.3 nm, a ~1 nm diameter CNT could fit inside the PMMA chain and ~5.4 nm diameter CNT inside the PAN chain. The helical polymer can accommodate CNTs with diameters within close range of the target diameter by minor change in bond angles and dihedral angles. However, the polymer chain may not necessarily form such a helical conformation. This can be due to more favorable morphologies, for example crystallization of PAN may lead to lower energy than the helical state, or that the side chain-solvent interaction may not be favorable for a helix to be formed. After verifying possible candidates, experimentation is required to determine if the polymer wraps the CNTs.

It has been surprisingly discovered that PMMA only wraps on SWNTs with diameter of ~1 nm and not on larger diameter CNTs, such as few wall carbon nanotubes (FWNTs) and multi wall carbon nanotubes (MWNTs). Without wishing to be bound by theory, this specificity of PMMA to SWNTs has been attributed to the bond angles of the PMMA backbone, which provide a hole sized for SWNTs, the favorable interaction between the CH2 side chains of PMMA with SWNT, and polymer-solvent interactions.

Figure 2B:
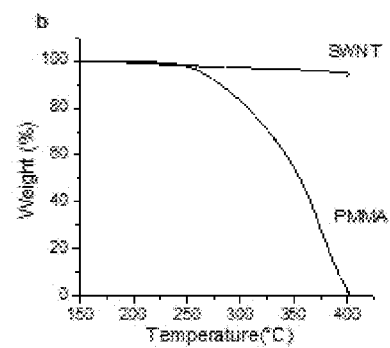

All three PMMA dispersions (with SWNT, FWNT, and MWNTs) contained 91% PMMA with respect to the total weight of PMMA and CNT in DMF. However, based on the TGA study shown in FIGS. 2A-B and the weight of the buckypaper after drying, it was estimated that the PMMA in FWNT/PMMA and MWNT/PMMA as produced buckypaper was 9% and 7%, respectively, while it was 37% in as produced SWNT/PMMA buckypaper. Thermogravimetric analysis of CNT/PMMA is shown in FIG. 2A; and of PMMA and SWNT buckypapers under Nitrogen at a heating rate of 10° C./min up to 400° C. and held at that temperature for 5 minutes. The SWNT buckypaper has around a 6 percent mass loss.

The remaining PMMA is filtered out with DMF during vacuum filtration. Higher PMMA weight retention in SWNT containing samples as compared to FWNT and MWNT containing samples suggests a specific interaction between PMMA and SWNT, and not between PMMA and FWNTs, and not between PMMA and MWNTs.

Figure 3A:
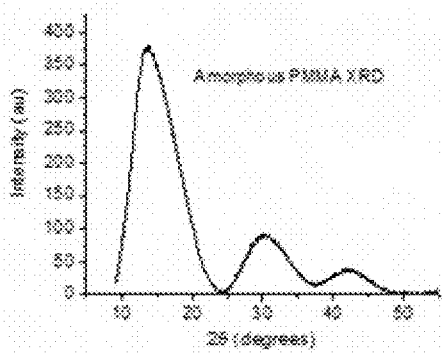
FIGS. 3A-B depict an exemplary embodiment showing no X-ray diffraction peak at about 10 degrees two theta.
Figure 3B:
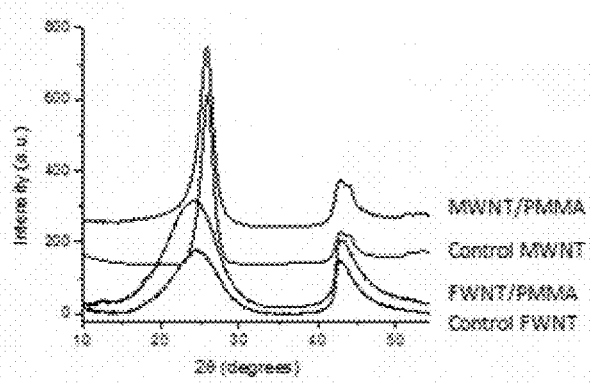
Figures 4A, 4B:
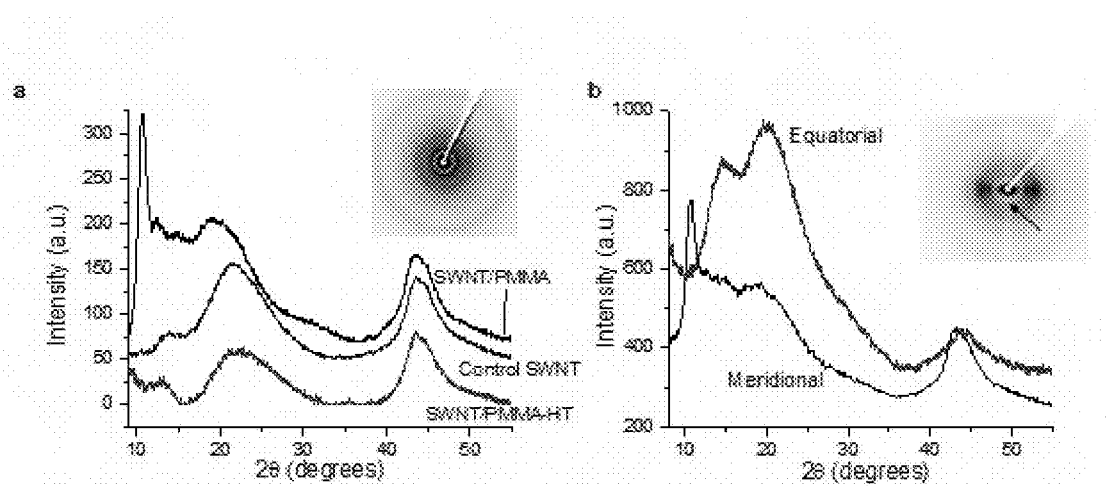
FIGS. 4A-B depict an exemplary embodiment showing the new X-ray diffraction peak at about 10 degree two theta.

The diffraction pattern of PMMA exhibits three amorphous peaks (FIG. 3A). The diffraction pattern of the FWNT/PMMA and MWNT/PMMA buckypapers is similar to their control buckypaper patterns as shown in FIG. 3B. FIG. 4A shows the wide angle X-ray diffraction of SWNT, SWNT/PMMA, and SWNT/PMMA-HT buckypapers. X-ray beam in all cases is perpendicular to the plane of the buckypaper. SWNT/PMMA-HT is a sample, where PMMA is completely removed. Inset is the 2D pattern of SWNT/PMMA. FIG. 4B shows meridional and equatorial scans of SWNT/PMMA buckypaper, and the 2D pattern (inset) when the X-ray beam is parallel to the plane of the buckypaper.

Sonication of SWNTs and PMMA in DMF results in a stable suspension, which after filtering the solvent, displayed a sharp peak at 0.83 nm (FIG. 4A). When the X-ray beam (Z-direction) is perpendicular to the buckypaper plane (XY plane), the diffraction pattern is isotropic, as expected. However, when the X-ray beam (Z-direction) is parallel to the plane of the buckypaper (XY plane), then the diffraction pattern exhibits anisotropy (FIG. 4B). The new strong intensity peak at 0.83 nm appears on the meridian, which suggests that the feature giving rise to this peak is oriented along the CNT axis. After burning out the PMMA at 400° C. in the presence of nitrogen, the sharp peak disappears and the resulting diffraction pattern is similar to that of the control SWNT buckypaper processed without PMMA.

Figure 5A:
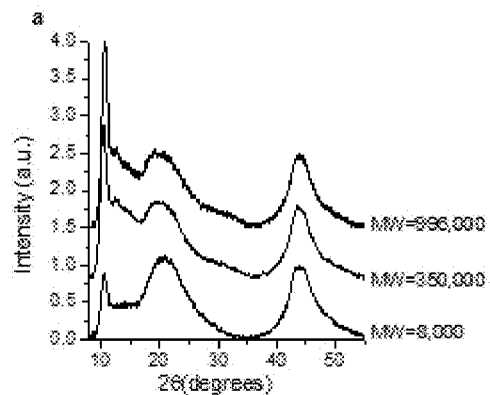
FIGS. 5A-B depict an exemplary embodiment of how PMMA at various molecular weights are effective helical wrappers.
Figure 5B:
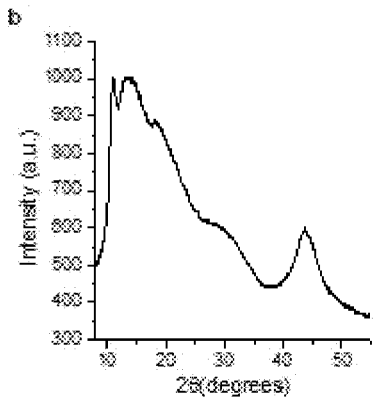

The 0.83 nm peak is observed regardless of the PMMA molecular weight. Three different molecular weight PMMA samples were used. FIG. 5A shows the wide angle X-ray diffraction of SWNT/PMMA buckypapers fabricated with different molecular weight PMMA as indicated. FIG. 5B shows the wide angle X-ray diffraction of SWNT/PMMA buckypaper, where solvent was removed via evaporation.

The 0.83 nm peak intensity increases with molecular weight, while the PMMA content in all three buckypapers prepared via filtration is comparable at ~37%. In contrast to filtration, where approximately 95% of the PMMA is filtered out with the solvent for the PMMA/SWNT buckypaper, when the solvent is removed via evaporation, all the PMMA remains in the buckypaper. Thus, the SWNT/PMMA buckypaper prepared by evaporation results in almost 20 times more PMMA than the buckypaper prepared by filtration. The SWNT/PMMA buckypaper prepared by evaporation still shows 0.83 nm ordered PMMA peak. However, this peak is almost dwarfed by the amorphous PMMA peak (FIG. 5B).

Figure 6:
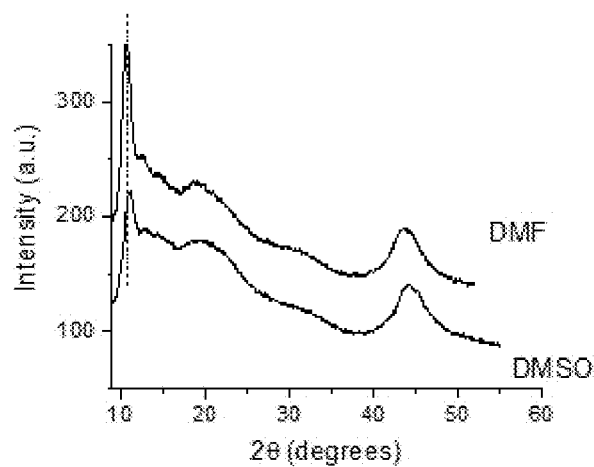
FIG. 6 depicts an exemplary embodiment of alternative solvents to DMF that produce the same or similar results.

Polymer wrapping also takes place in other polar organic solvents such as dimethyl sulfoxide (DMSO), nitromethane, and the like. FIG. 6 shows X-ray diffraction of SWNT/PMMA buckypapers processed with DMF and DMSO. When DMSO is used the intensity of the shark peak is smaller and shifted from $2\theta=10.8°$ to $11.2°$, corresponding to a d-spacing of 0.79 nm (FIG. 6). The PMMA wrapped SWNTs do not disperse in DMSO. Instead, aggregates are formed. This may be due to the interaction between the methyl-methacrylate functional groups on SWNT surfaces with the solvent.

Figure 7:
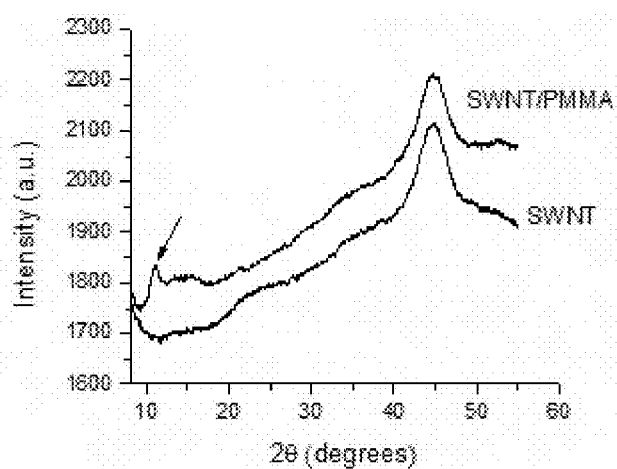
FIG. 7 depicts an exemplary embodiment of alternative solvents to DMF that produce the same or similar results.

The new peak is also observed when nitromethane, which is also a good solvent for both PMMA and SWNTs, is used instead of DMF. FIG. 7 shows the X-ray diffraction pattern of unpurified SWNT and SWNT/PMMA processed with nitromethane. Since unpurified SWNTs were used, the diffraction pattern was swamped by the metallic impurities. Despite the strong baseline intensity from the impurities, the peak at ~10.8° was still visible in the buckypaper XRD (FIG. 7).

Figure 8:
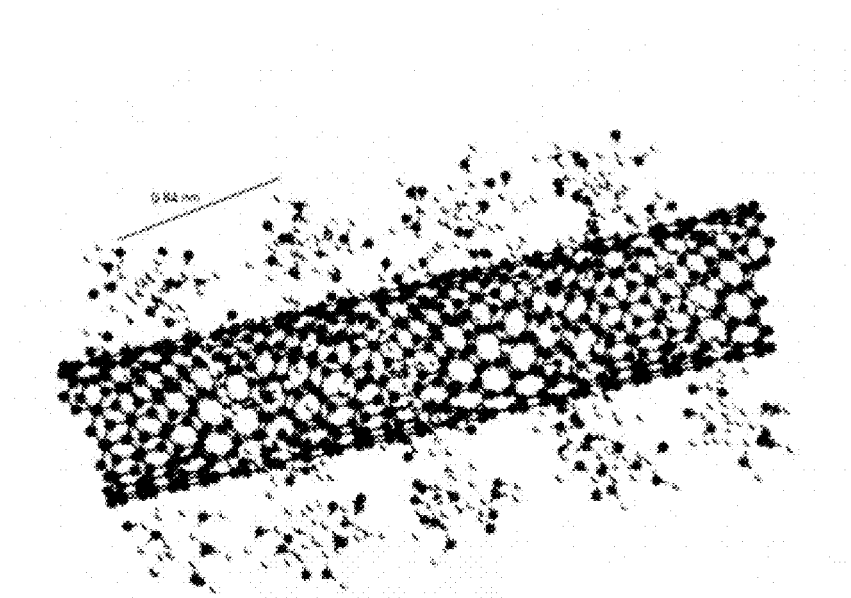
FIG. 8 depicts an exemplary embodiment of an ordered helical wrapping model.

Helical wrapping of PMMA is suggested for the SWNT/PMMA interaction. FIG. 8 shows SWNT (12,1) wrapped by PMMA. Indeed, PMMA wraps neatly around SWNTs and the sharp peak in the XRD corresponds to the distance between pendant groups along the nanotube axis. From energy minimization of PMMA chains in trans configuration, the C—C—C bond angle in the backbone is ~107°, when methyl methacrylate (MMA) is on the central carbon, and ~123°, for the other carbon. The model is initiated with these C—C—C bond angles. The dihedral angle is chosen to match the helical pitch of 0.83 nm. The tacticity is achieved by assigning the methacrylate group to the left or right side based on a randomly generated binary vector. Each complete helical revolution consists of 21 to 22 monomers, with a diameter of ~1.6 nm, creating a hole sized for smaller nanotubes. Energy minimization (using Chembio3D molecular dynamics simulation) is carried out on the initial chain model.

Enthalpy driven CH-π interactions are possibly the main drive for the wrapping, resulting in lower energy. The existence of CH-π interactions is known. Baskaran, D., J. W. Mays, and M. S. Bratcher, *Noncovalent and Nonspecific Molecular Interactions of Polymers with Multiwalled Carbon Nanotubes*. Chemistry of Materials, 2005. 17(13): p. 3389-3397; Nishio, M., Y. Umezawa, M. Hirota, and Y. Takeuchi, *The CH/π interaction: Significance in molecular recognition*. Tetrahedron, 1995. 51(32): p. 8665-8701; Kodama, Y., K. Nishihata, M. Nishio, and N. Nakagawa, *Attractive interaction between aliphatic and aromatic systems*. Tetrahedron Letters, 1977. 18(24): p. 2105-2108. The strength of the CH-π is one tenth of hydrogen bonding but multiple CH-π interactions along the polymer chain length between the CH2 and the π bonds can add up to make the helical wrapping energetically favorable. If the SWNT structure does not change significantly after removing the PMMA as a first order approximate, the diffraction pattern of the PMMA in the SWNT/PMMA buckypaper can be obtained by subtracting the diffraction pattern of SWNT from SWNT/PMMA as shown in FIG. 9A. The diffraction pattern of the energy minimized helical model was obtained using Debyer and is shown in FIG. 9B, which is similar to the diffraction pattern of the ordered PMMA.

The suspendability of CNTs is generally low, even in good solvents. In order to get a good SWNT suspension during sonication, a concentration of at most 14 mg/L is required. If the concentration of the SWNTs is too high, the nanotubes will not disperse regardless of the sonication time.

Sonicated SWNT/DMF and SWNT/PMMA/DMF suspensions have similar appearance initially (FIGS. 10A-B) However, the SWNT/DMF suspension precipitates within 2 hours of centrifugation at 2,000 g (FIG. 10C); while the SWNT/PMMA/DMF dispersion is quite stable and exhibits very little sedimentation under comparable centrifugation conditions (FIG. 10D). This SWNT/PMMA/DMF suspension exhibits no further change even after prolonged centrifugation time of 72 hours, and it remains stable for several months (observed for 3 months).

SWNT wafers, or buckypapers, typically have a surface area of about 650 m2/g. Using PMMA wrapping, SWNT buckypapers with surface area as high as 950 m2/g have been processed. These buckypapers exhibit significantly higher energy storage performance when used as electrodes in electrochemical supercapacitor. Energy storage in supercapacitors is based on the adsorption of electrolyte ions on the surface area of electrically conductive porous electrodes, usually porous carbons. Additionally, micro-supercapacitors have gained attention due to their application as power sources in micro-electrical systems. Micro-supercapacitors can also be made using the current technique, as the PMMA wrapped SWNTs can be deposited on any substrate. The simple processing method for achieving high surface area SWNT buckypapers makes this method an excellent candidate for future commercial applications.

Figure 13A:
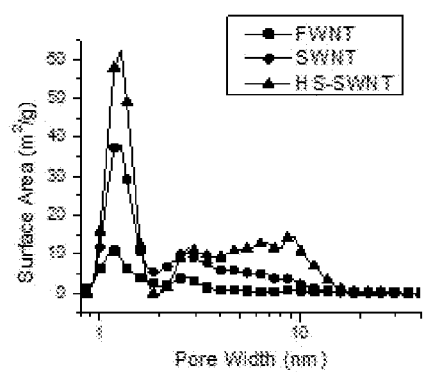
FIGS. 13A-B depict an exemplary embodiment of data showing high surface area and controlled pore size useful for energy storage.
Figure 13B:
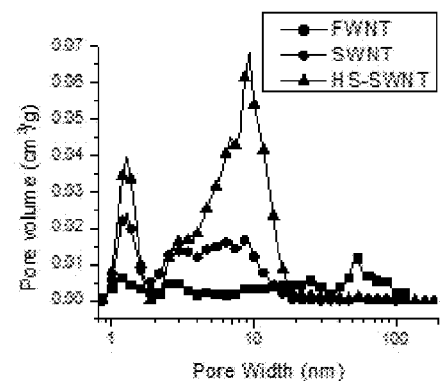

The specific surface area (SSA) of the different buckypapers is presented in Table 1. FWNTs have lower SSA than SWNTs since the inner walls are not accessible. The SWNT sample exhibits an SSA of 600 m2/g, since the nanotubes can rebundle after sonication and reduce surface area. However, for the high surface area PMMA processed buckypapers, HS-SWNT, we obtained SSA as high as 1030 m2/g (average bundles of 4 SWNT from theoretical calculations). Measurements of 11 PMMA processed buckypapers yielded an average specific surface area of 943±69 m2/g. The increase of SSA for the PMMA processed SWNT buckypaper compared to the SWNT buckypaper confirms that the PMMA wrapping prevents the aggregation of the SWNTs, resulting in higher SSA after the PMMA is removed. The added pores are mainly micro and mesopore in size, from 1 to 11 nm pore width, as shown in FIGS. 13A-B. FIG. 13A shows pore size distribution as it relates to surface area and FIG. 13B shows pore size distribution as it relates to pore volume at varying pore sizes.

The additional surface area in the 1 nm region are likely due to the removed PMMA wrapping, resulting in micropores between adjacent nanotubes.

TABLE 1

Surface Area measurement for the CNT and CNT/PMMA buckypapers. SWNT sample average of 5 measurements and HS-SWNT sample average of 10 measurements.

| Sample | BET SSA (m²/g) | Comments |
|---|---|---|
| FWNT | 260 | Slurry |
| FWNT | 450 | As sonicated |
| SWNT | 460 | Slurry |
| SWNT | 600 ± 100 | As sonicated |
| SWNT/PMMA | 280 | PMMA processed |
| HS-SWNT | 950 ± 70 | PMMA processed-PMMA |

Entangled carbon nanotubes form a freestanding film referred to as buckypaper. Wrapping SWNTs with PMMA in buckypaper increases the modulus and tensile strength by a factor of 5.9 and 3.7, respectively, compared to pristine SWNT buckypaper. Without wishing to be bound by theory, this increase is attributed to the debundling effect of the helical PMMA around SWNTs. The debundled SWNTs form a network of individual SWNTs that are more effective in transferring stress to the nanotubes in the buckypaper compared to bundled SWNTs in the pristine buckypaper. Stress transfer studies on buckypapers reveal that while non-wrapped SWNTs experienced negligible stress during deformation, PMMA wrapped SWNTs take up to ~1 GPa stress before mechanical failure of the buckypaper. The modulus of composite films with PMMA wrapped SWNTs is 75% higher than non-wrapped SWNT films.

The increase (or decrease) of modulus and tensile strength of PMMA and composite films are shown in Table 2. The low tensile properties of PMMA in Mathur (Mathur, R. B., S. Pande, B. P. Singh, and T. L. Dhami, *Electrical and mechanical properties of multi-walled carbon nanotubes reinforced PMMA and PS composites*. Polymer Composites, 2008. 29(7): p. 717-727) and Blond (Blond, D., V. Barron, M. Ruether, K. P. Ryan, V. Nicolosi, W. J. Blau, and J. N. Coleman, *Enhancement of Modulus, Strength, and Toughness in Poly(methyl methacrylate)-Based Composites by the Incorporation of Poly(methyl methacrylate)-Functionalized Nanotubes*. Advanced Functional Materials, 2006. 16(12): p. 1608-1614) is due to the low molecular weight of PMMA which were even shorter than the nanotube lengths. The CNT reinforced composite films had even lower mechanical properties than neat PMMA films with a molecular weight of 350,000 g/mol. Another study which used dry blending and melt extrusion reported negligible improvement upon addition of unoriented MWNTs (Gorga, R. E. and R. E. Cohen, *Toughness enhancements in poly(methyl methacrylate) by addition of oriented multiwall carbon nanotubes*. Journal of Polymer Science Part B: Polymer Physics, 2004. 42(14): p. 2690-2702), while aligning the MWNTs led to a 38% and 25% higher modulus and tensile strength along the CNT direction, respectively. Sabba (Sabba, Y. and E. L. Thomas, *High-Concentration Dispersion of Single-Wall Carbon Nanotubes*. Macromolecules, 2004. 37(13): p. 4815-4820.) Liu reported a 130% increase in strain to failure, but no impact on modulus and strength upon addition of 1 wt % SWNTs (Liu, J., A. Rasheed, M. L. Minus, and S. Kumar, *Processing and properties of carbon nanotube/poly(methyl methacrylate) composite films*. Journal of Applied Polymer Science, 2009. 112(1): p. 142-156). Using nitromethane as the solvent has also shown promise for dispersing SWNTs in PMMA. Id. Composite films were made with two different SWNT purities, 65 wt % and 97.8 wt %, showing the detrimental effect of impurities on tensile strength.

TABLE 2

Mechanical properties and electrical conductivity of PMMA/CNT films in literature. The results of the current study are included for comparison. Values in parenthesis indicate improvement (or decrease) compared to the control samples without SWNT.

| CNT (wt %) | Tensile Modulus (GPa) | Tensile Strength (MPa) | Conductivity (S/m) | Comments |
|---|---|---|---|---|
| 10 | 1.78 (+70%) | 23 (−5%) | 100 | Mathur: MWNT <90% purity, solvent casting |
| 0.25 | 1.38 (+90%) | 37 (+363%) | — | Blond: MWNT, in situ polymerization |
| 10 | 3.7 GPa (+38%) | 80 (+25%) | — | Gorga: MWNT, dry blend and melt extrusion, oriented |
| 1 | N/A (0%) | 44 (0%) | — | Sabba: Hydroxylamine hydrochloric acid salt treated SWNTs |
| 10 | 4.4 (+144%) | 63 (+26%) | 854 | Liu: SWNT (2.4 wt % impurity), sonicating and stirring |
|  | 4.1 (+127%) | 23 (−54%) | 1430 | Liu: SWNT (35 wt % impurity), sonicating and stirring |
| 10 | 3.2 (+100%) | 48 (−11%) | 26 | This work, SWNT (35 wt % impurity) |

PMMA wrapped and non-wrapped SWNTs have been incorporated in PAN fibers and the effect of PMMA wrapping on mechanical properties, and stress transfer is disclosed herein. The stress transfer analysis of SWNTs in precursor fiber indicated 45% higher interfacial shear strength in PMMA wrapped SWNTs compared to non-wrapped SWNTs. PMMA wrapping effectively debundled SWNTs in the polyacrylonitrile (PAN) fibers as evidenced by Raman spectroscopy of the precursor fiber. SEM images of the carbon fiber fracture surface revealed 60% reduction in fibril size when PMMA wrapped SWNTs were used instead of non-wrapped SWNTs.

Herein, films, fibers, and buckypapers of carbon nanotubes with and without PMMA wrapping were made, and the effect of PMMA wrapping on the stress transfer from the matrix to the nanotubes was investigated. Unexpectedly, the PMMA wrapping greatly improves SWNT dispersion, and individualized SWNTs in buckypapers and composites films. The debundling and isolation of SWNTs improves stress transfer to the SWNTs, which in turn leads to better mechanical properties.

EXAMPLES

Materials and Instrumentation

SWNTs (grade sp300, average diameter 0.9 nm, purity 98%) synthesized by high pressure carbon monoxide processing and FWNTs (grade XOC231U, average diameter 2.7 nm, mainly two and three walled, purity 98.8%) were obtained from Carbon Nanotechnologies, Inc. MWNTs (average diameter 25 nm, purity 95%) were obtained from Cheaptubes, Inc.

Poly(methyl methacrylate) (PMMA) polymers with molecular weights of 8,000, 350,000, and 996,000) were obtained from Sigma Aldrich. PTFE membrane (Zefon International, FPTPT147) with 1 □m pore size were used for the filtration.

Dimethylformamide (DMF, ACS grade, 99.8% purity) polymers were obtained from Sigma Aldrich. PTFE membrane with 1 □m pore size were used for the filtration and were obtained from Zefon International, FPTPT147.

Wide-angle X-ray diffraction (WAXD) data were obtained in transmission mode on a Rigaku Micromax-002 ($\lambda$=0.15418 nm) system.

Raman spectra were obtained using a 785 nm laser on a HORIBA XploRA Raman Microscope System.

UV-vis spectra were obtained on Perkin Elmer Lambda 35 instrument.

BET surface area measurements were made with Micromeritics ASAP 2020.

MATLAB was used to generate initial PMMA coordinates and Chembio3D was used for energy minimization. After energy minimization the atom coordinates were used to model the diffraction pattern using Debyer. McClory, C., T. McNally, M. Baxendale, P. Pötschke, W. Blau, and M. Ruether, *Electrical and rheological percolation of PMMA/MWCNT nanocomposites as a function of CNT geometry and functionality*. European Polymer Journal, 2010. 46(5): p. 854-868.

The dispersion of PMMA with SWNTs were conducted to produce a composite. A suspension containing 8 mg CNT in 600 ml DMF was homogenized (IKA ULTRA-TURRAX T18) for 30 minutes and then 80 mg PMMA (dissolved in 40 ml DMF) was added to this CNT/DMF suspension. For all molecular weights used in this study, the PMMA concentration in the suspension is well below the critical overlap concentration. After vigorous shaking, this PMMA/CNT/DMF suspension was sonicated for 24 hours (Branson 3510R-MT, 100 W, 42 kHz). Then the suspension was filtered using the PTFE membrane and washed with methanol to remove DMF. The produced PMMA/CNT bucky paper was peeled from the PTFE membrane and dried in vacuum oven at 70° C. for 3 days. These bucky papers are referred to as "as produced" buckypaper. PMMA that is interacting with the CNTs, as well as the PMMA that is entangled or trapped, will remain in the bucky paper, and the rest of the PMMA will be filtered out. To analyze the weight of the bucky paper, thermo gravimetric analysis (TGA) was done in nitrogen at a heating rate of 10° C./min. The TGA study shows that PMMA was removed from the PMMA/CNT bucky papers by heat treatment at 400° C. Control bucky papers (without the use of PMMA) from different CNTs were also made for comparison using the above process.

PMMA was dissolved in DMF at a concentration of 150 mg per 10 mL, and the solution was dry cast in a glass mold. For CNT composites, CNTs were sonicated in 10 mL of DMF for 24 hours and the polymer powder was added to the solvent and stirred for 24 hours and poured into the mold. For PMMA wrapped SWNTs, SWNT and PMMA (1:1 weight ratio of SWNT:PMMA) were sonicated in 10 mL of DMF. Then polymer powder was added and stirred for 24 hours and dry cast.

PMMA/SWNT films were made with 0.1 wt % SWNT by dry casting. The suspensions were prepared at a concentration of 15 mg/L. The films were made with and without PMMA wrapped SWNTs. This was done by adding a small amount of PMMA (1:1 PMMA:SWNT) before sonication to achieve PMMA wrapping. After 24 hours of sonication, PMMA was added to the suspensions to reach the final PMMA:SWNT ratio of 1000:1 and stirred for 24 hours.

Figure 23A:
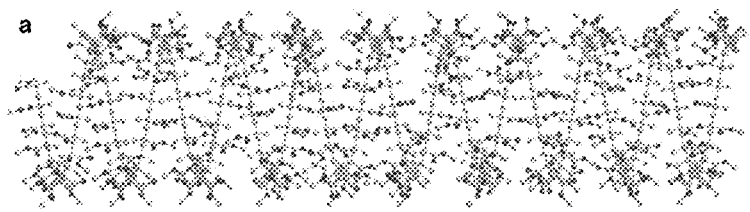
FIGS. 23A-C depict an exemplary embodiment showing an ordered helical wrapping model.
Figure 23B:
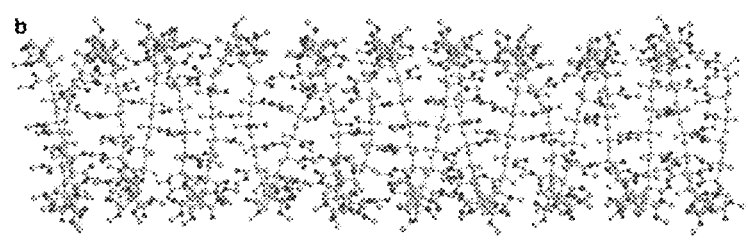
Figure 23C:
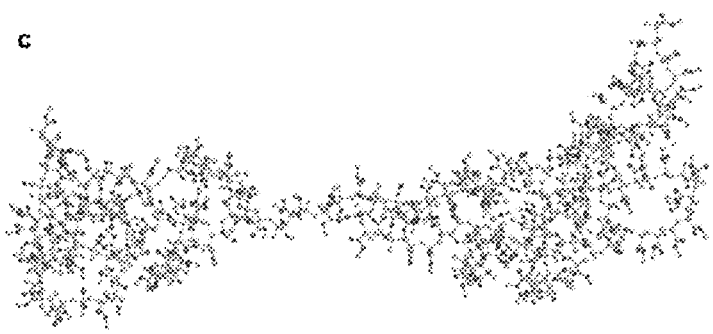

Energy minimization (using Chembio3D molecular dynamics simulation) was carried out on the initial chain model shown in FIG. 23A, and the minimum energy configuration is shown in FIG. 23B. After this energy minimization, chain was heated to 400 K, and the energy minimization process was again carried out. The resulting random coil configuration is shown in FIG. 23C. The total energy of the PMMA went from 77670, to 2980, and subsequently to 2890 kcal/mol, showing that the energy for the helical configuration is only slightly higher than that of the random coiled state.

Figure 24A:
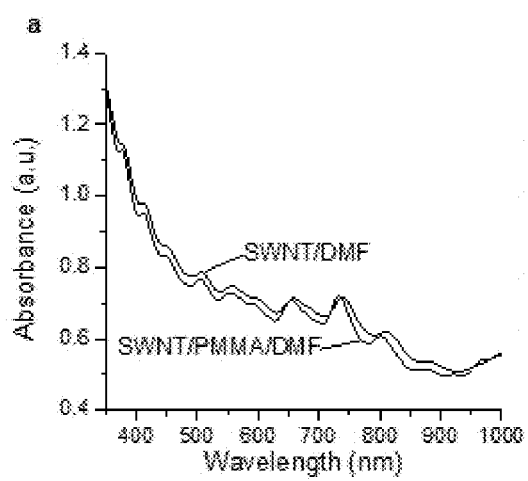
FIGS. 24A-B depict an exemplary embodiment showing the UV-vis absorption spectra of the SWNT/DMF and SWNT/PMMA/DMF suspensions before and after centrifugation.
Figure 24B:
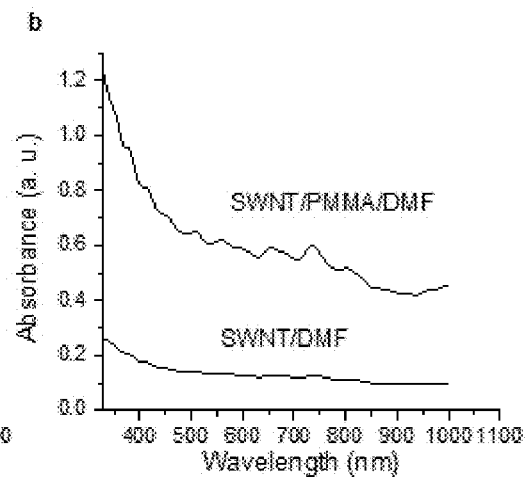

The UV-vis absorption spectra of the SWNT/DMF and SWNT/PMMA/DMF suspensions before and after centrifugation are shown in FIGS. 24A and 24B, respectively. The suspensions were centrifuged for 2 hours at 10,000 RPM and the supernatants were collected for UV-vis. The SWNT/DMF suspension shows much lower absorbance after centrifugation due to higher re-aggregation and sedimentation of the nanotubes, resulting in lower SWNT concentration in the supernatant. The van Hove transitions in SWNT/PMMA/DMF were blue shifted 12-24 meV as compared to SWNT/DMF both before and after centrifugation (FIGS. 24A-B). The van Hove transition energy of nanotubes redshift upon bundling. O'Connell, M. J., S. Sivaram, and S. K. Doorn, *Near-infrared resonance Raman excitation profile studies of single-walled carbon nanotube intertube interactions: A direct comparison of bundled and individually dispersed*. Physical Review B, 2004. 69(23): p. 235415. This indicates that the SWNT reaggregation starts immediately after stopping sonication. So the PMMA wrapping not only prevents nanotube aggregation and sedimentation, but the PMMA wrapped nanotubes are more exfoliated compared to the SWNT suspension.

Figure 11A:
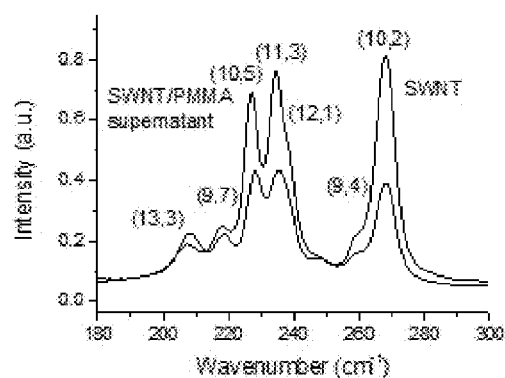
FIGS. 11A-B depict an exemplary embodiment showing Raman data of individual SWNTs.

Raman spectra using a 785 nm laser and samples that were prepared by depositing SWNT/DMF or SWNT/PMMA/DMF on a glass slide is shown in FIG. 11A. FIG. 11A shows higher intensity for (12,1), (10,5) and (9,7) and lower intensity for (10,2), (9,4) and (13,3) nanotubes for SWNT/PMMA compared to SWNT samples; at that laser energy the former three nanotubes are in resonance when individualized while the latter three are in resonance while bundled, showing the influence of polymer wrapping on individualizing the nanotubes. The Raman profile of the SWNT/PMMA sample is similar to that of SDS/SWNT, where the SDS surfactant is intended to exfoliate the bundled nanotubes.

Figure 11B:
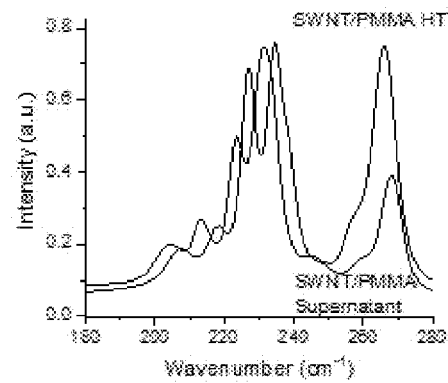

After removing the PMMA by heat treatment, the nanotube-nanotube interaction increases, causing a redshift in the transition energy, hence a change in RBM intensities, as shown in FIG. 11B. The nanotubes are restricted in the buckypaper network and are not free to rebundle and pack as well as the as sonicated SWNT. The redshift of E22 transition energy reverses the intensity of the peaks of the debundled SWNT/PMMA. Since the change in transition energy is not the same for all nanotubes (O'Connell, M. J., S. Sivaram, and S. K. Doorn, *Near-infrared resonance Raman excitation profile studies of single-walled carbon nanotube intertube interactions: A direct comparison of bundled and individually dispersed.* Physical Review B, 2004. 69(23): p. 235415.), the intensities do not change proportionately. There is an upshift of ~2 cm-1 for all of the RBM frequencies in the SWNT/PMMA and SWNT samples compared to SWNT/PMMA-HT, which could be attributed to polymer wrapping (Bonhommeau, S., P. Deria, M. G. Glesner, D. Talaga, S. Najjar, C. Belin, L. Auneau, S. Trainini, M. J. Therien, and V. Rodriguez, *Raman Spectroscopic Investigation of Individual Single-Walled Carbon Nanotubes Helically Wrapped by Ionic, Semiconducting Polymers.* The Journal of Physical Chemistry C, 2013. 117(28): p. 14840-14849, Fantini, C., A. Jorio, A. P. Santos, V. S. T. Peressinotto, and M. A. Pimenta, *Characterization of DNA-wrapped carbon nanotubes by resonance Raman and optical absorption spectroscopies.* Chemical Physics Letters, 2007. 439(1-3): p. 138-142, Quan-Hong, Y., G. Nittaya, J. O. Claudio, L. Feng, V. Alun, S. Riichiro, S. N. Iris, T. Zhi-Yuan, C. Hui-Ming, B. Tom, and H. L. Wei, *A Raman probe for selective wrapping of single-walled carbon nanotubes by DNA.* Nanotechnology, 2007. 18(40): p. 405706.) and bundling (Wonsuk, J., W. Ju Yeon, L. Seung Ho, K. Duckjong, K. Soohyun, and H. Chang-Soo, *Evaluation of the individualization state in single-walled carbon nanotube solutions using absorption, Raman and photoluminescence spectroscopy.* Measurement Science and Technology, 2012. 23(12): p. 125501, Kuzmany, H., W. Plank, M. Hulman, C. Kramberger, A. Gruneis, T. Pichler, H. Peterlik, H. Kataura, and Y. Achiba, *Determination of SWCNT diameters from the Raman response of the radial breathing mode.* Eur. Phys. J. B, 2001. 22(3): p. 307-320), respectively.

The surface area and pore size of nanomaterials can be measured using gas adsorption. To analyze the porosity, the sample is first degassed to remove all moisture from the porous structure. The sample is heated to 90° C. under vacuum and kept at that temperature for 16 hours to ensure complete removal of moisture. The sample tube is then backfilled with nitrogen gas. At this stage the sample is ready for analysis. In the beginning of the analysis, the sample tube is evacuated to very low pressures. Depending on the analysis gas and the bath temperature, different amounts of gas is admitted into sample tube to probe the material structure. When the adsorbate gas is nitrogen (N2) the bath temperature is maintained at 77 K. Nitrogen is admitted in incremental doses at different partial pressures up to the gas saturation pressure to probe the pore structure of the material. The amount of gas quantity adsorbed versus gas pressure is plotted to generate an adsorption isotherm, which can reveal the structure of the adsorbing material (called adsorbent) from the shape of isotherm.

For surface area and pore size analysis, isothermal N2 gas adsorption study was carried out on various buckypapers using ASAP 2020 (Micromeritics Inc.) at 77 Kelvin. BET and BJH theories were used to obtain the specific surface area and pore size distribution, respectively. Scanning electron microscopy (SEM) was performed on a Hitachi SU8010 at an accelerating voltage of 5 kV. SEM was done on buckypapers without any metal coating. X-ray photoelectron spectroscopy (XPS) (Thermal Scientific K-alpha XPS instrument) was employed to analyze the buckypaper chemical composition. Raman spectroscopy on the buckypapers was carried out using 785 nm laser HORIBA XploRA Raman Microscope System. Scanning electron microscopy (SEM) was performed on a Hitachi SU8010 at an accelerating voltage of 5 kV. SEM was done on buckypapers without any metal coating. X-ray photoelectron spectroscopy (XPS) (Thermal Scientific K-alpha XPS instrument) was employed to analyze the buckypaper chemical composition. Raman spectroscopy on the buckypapers was carried out using 785 nm laser HORIBA XploRA Raman Microscope System. Galvanostatic constant current (CC) charging-discharging and cyclic voltammetry (CV) measurements were carried out on Solartron 1470 at room temperature, using two film electrodes. Electrode diameter, thickness and mass were approximately 6.4 mm, 15 µm, and 0.3 mg, respectively. The electrode density was 0.63±0.02 g/cm3, and the electrodes were separated by Celgard 3400 microporous membrane and were sandwiched between stainless steel current collectors. KOH aqueous solution (6 M) with potential range of 0 to 1 V and 1-Ethyl-3-methylimidazolium tetrafluoroborate (EMIMBF4) with a potential range of 0 to 3 V were used as the electrolytes. For the constant current measurements, the specific capacitance was obtained using $$C_{sp} = \frac{I\Delta t}{\Delta V}\left(\frac{1}{m_1} + \frac{1}{m_2}\right)$$

where I is the current, m1 and m2 are the masses of the two electrodes, $\Delta t$ is the discharge time, $\Delta V$ is the discharge voltage during that time. Determination of $\Delta t/\Delta V$ excludes the IR drop occurring at the beginning of the discharge. The energy density was calculated using $$E = \frac{\int VIdt}{m_1 + m_2},$$

and power density is $$P = \frac{E}{t_d},$$

where td is the total discharge time. The specific capacitance of the cyclic voltammetry measurements of each electrode was obtained using $$C_{sp} = \frac{\int IdV}{2R\Delta V}\left(\frac{1}{m_1} + \frac{1}{m_2}\right),$$

where the integral is the area enclosed in the V-I plot, R is the CV scan rate and $\Delta V$ is the potential window.

Two types of PMMA/SWNT composite films were prepared, one set with PMMA wrapping and another set without PMMA wrapping, with 0.1 to 10 wt % SWNT content. The non-wrapped PMMA/SWNT was prepared by sonicating SWNTs (Branson 3510R-MT, 100 W, 42 kHz), 0.15 (0.1 wt %), 1.5 (1 wt %), 7.5 (5 wt %) and 15 mg (10 wt %), in 15 mL DMF for 24 hours, then adding PMMA to obtain a solid content of 150 mg and mixed by stirring for 12 hours. The wrapped PMMA/SWNT films were prepared by sonicating SWNTs in DMF in the presence of PMMA with a 1:1 PMMA to SWNT weight ratio for 24 hours. Then the remaining amount of PMMA is added to obtain a solid content of 150 mg and mixed by stirring for 12 hours. The suspensions were cast in a glass mold to form ~40 µm thick films. The films were dried at 65° C. under vacuum for 24 hours. The SWNT buckypaper suspension was prepared by sonicating 12.3 mg of unpurified SWNTs (8 mg SWNTs) in 400 mL DMF for 24 hours. The PMMA-wrapped SWNT suspension was prepared by sonicating 12.3 mg of unpurified SWNTs with 8 mg of PMMA in 50 mL of DMF for 24 hours. Buckypapers were made by vacuum filtration of the suspensions, with subsequent wash with MeOH, and were then peeled off from the filter and dried. The purified tubes were used only for the 0.1 wt % SWNT film and the rest of the samples were made with the raw nanotubes.

Scanning electron microscopy (SEM) was performed on a Hitachi SU8010 at an accelerating voltage of 5 kV. Tensile measurements and dynamic mechanical analysis (DMA) were carried out by RSA III (Rheometrics Scientific) solid analyzer equipped with a linear tension clamp. The tensile test samples had a width of ~2 mm. The gauge length and the strain rate for the tensile tests were set at 10 mm and 0.50%/s, respectively. The thickness of the films and buckypaper samples were ~40 µm and ~20 µm, respectively. Dynamic mechanical properties as a function of temperature were determined at 1 Hz frequency, with static force adjusted to be 20% larger than dynamic force. Raman spectra were obtained using a 785 nm laser on a HORIBA XploRA Raman Microscope System. Raman spectra were collected during film deformation at a gauge length of 10 mm by straining 2 mm thin strips using a stretching rig. The Raman spectra were collected using parallel (VV) polarizers with the straining direction parallel to the polarizer and analyzer directions. Infrared spectra (IR) were collected with a Perkin Elmer Spectrum One infrared microscope. Electrical conductivity of various SWNT films was measured by a standard four-point probe configuration (Signatone).

15 g of PAN-co-MAA was added to 100 mL DMF at room temperature while stirring inside a 1 L reactor. The reactor was transferred to an ice bath and stirring was started immediately at 300 RPM under nitrogen purge (30 SCFH). After three hours the chilled water bath was replaced with silicone oil bath and the bath temperature was increased gradually from 25 to 80° C. This initial preparation stage was the same for all trials. The PAN solution was stirred at 90° C. for 4 hours and control fiber was spun (T1).

Master batch SWNT suspensions were prepared by adding 150 mg SWNTs to 300 mL DMF, and homogenized for 10 minutes. 30 mL of this suspension (containing 15 mg SWNT) was added to 300 mL DMF and sonicated for 24 hours. The first sonicated SWNT dispersion was transferred to the reactor containing the dissolved PAN and vacuum distillation was started. Ten bottles containing DMF/SWNT were added to the reactor and distillation was carried out during day time over the period of 1 week. The solution was kept under stirring condition (300 RPM) overnight with bath temperature of 75-80° C. under nitrogen flow of 30 SCFH (T2).

The PMMA wrapped SWNT solution was prepared by adding 15 mg PMMA along with 15 mg SWNTs in DMF and sonicating for 24 hours. Ten bottles containing DMF/SWNT/PMMA were added to the reactor and distillation was carried out during day time over the period of 1 week. The solution was kept under stirring condition (300 RPM) overnight with bath temperature of 75-80° C. under nitrogen flow of 30 SCFH (T3).

To study the effect of air atmosphere the purge gas was switched to air during the night. PAN/SWNT (T4) and PAN/SWNT/PMMA (T5) fibers were prepared from solution which were kept under stirring condition (300 RPM) overnight with bath temperature of 85-90° C. under air flow of 30 SCFH.

For spinning, the solutions were transferred to the barrel of a spinning system designed by Hills, Inc. and a spinnerette with a 200 µm diameter hole was used for fiber spinning. The barrel temperature was kept at ~56° C. and the spinneret temperature at ~75° C. All fibers were spun into methanol coagulation bath at about −40° C. with an air gap of ~3 cm. As-spun fibers were stored in a methanol bath at −30° C. for over 20 hours and subsequently drawn at room temperature followed by drawing in a glycerol bath at ~160° C.

Stabilization and carbonization was done in an MHI tube furnace. A dual mount setup was used to process two set up fibers simultaneously. A temperature ramp rate of 5° C./min was used for all steps. Carbonization scheme was carried out at 1300° C. and held at that temperature for 5 minutes and allowed to cool down under nitrogen purge.

Single filament PAN precursor and carbon fiber tensile testing was performed on a FAVIMAT+ (Measured Solutions, Inc.). A gauge length of 25.4 mm was used for testing. The strain rates for tensile testing for precursors and carbon fibers were 1%/s and 0.1%/s, respectively. The linear density of each filament tested was measured by inline vibroscope. Raman spectra were obtained using a 785 nm laser on a HORIBA XploRA Raman Microscope System. Raman spectra were collected during fiber deformation at a gauge length of 25 mm by straining individual fiber filaments strips using a stretching rig. The Raman spectra were collected using parallel (VV) polarizers with the straining direction parallel to the polarizer and analyzer directions. Infrared spectra (IR) were collected with a Perkin Elmer Spectrum One infrared microscope. Wide-angle X-ray diffraction (WAXD) data were obtained in transmission mode on a Rigaku Micromax-002 ($\lambda$=0.15418 nm) system. Scanning electron microscopy (SEM) was performed on a Hitachi SU8010 at an accelerating voltage of 5 kV.

Example 1

CNT Suspension Quality and its Influence on Buckypaper and Film Quality

The suspendability of CNTs are generally low, even in good solvents. In order to get a good SWNT suspension during sonication, a concentration of at most about 14 mg/L is required. If the concentration of the SWNTs is too high, the nanotubes will not disperse regardless of the sonication time.

FIGS. 10A-B show that as sonicated SWNT/DMF and SWNT/PMMA/DMF suspensions had similar appearance initially. However, FIGS. 10C-D show that the SWNT/DMF suspension precipitated within 2 hours of centrifugation at 2,000 g while the SWNT/PMMA/DMF dispersion was quite stable and exhibited very little sedimentation under comparable centrifugation conditions. This SWNT/PMMA/DMF suspension exhibited no further change even after prolonged centrifugation time of 72 hours, and it remained stable indefinitely (observed for 3 months).

The dispersion quality will have an influence on the preparation of films, fibers buckypapers, and the like. A bad dispersion will result in non-homogeneous samples which are difficult to process, and will have negative impact on the mechanical and functional properties of the composite. When the concentration is high and the SWNT dispersion is not well suspended, the resulting buckypaper does not have good integrity and tears easily upon peeling. This is the result of individual aggregates stacking on each other during filtration, resulting in a minimal interaction between these bundles. In addition to that, since the nanotubes are not entangled and restrained, the buckypaper shrinks by about a third in diameter upon drying. Therefore, just by visually examining the buckypaper the dispersion quality can be inferred.

When a buckypaper is made with a well dispersed suspension at low CNT concentration, an entangled network of individual and small bundles of nanotubes is created. The entangled network of CNTs provides the buckypaper with modest mechanical properties and integrity, which facilitates peeling and handling of the buckypaper. By processing the SWNTs with PMMA, the SWNTs can be suspended at concentrations as high as about (800 mg/L), where the resulting buckypapers exhibit the qualities of well dispersed SWNTs.

The effect of PMMA wrapping on dispersion is even more obvious in dry cast PMMA films. For the SWNT wrapped system, the dispersion was stable and homogeneous resulting in a homogenous film. On the other hand, the non-wrapped SWNTs form aggregates in the film. While the SWNT suspension was visibly homogeneous after sonication, after adding PMMA powder and initiating stirring, the SWNTs started to form visible aggregates within 20 minutes. Micrographs of the films show severe aggregation and inhomogeneities in the non-wrapped SWNT film, while the wrapped SWNT film exhibits a fine uniform dispersion.

Example 2

UV-Vis Spectroscopy of Suspension

UV-vis spectroscopy was used to show absorption spectra of the SWNT/DMF and SWNT/PMMA/DMF suspensions before and after centrifugation. The suspensions were centrifuged for 2 hours at 10,000 RPM and the supernatants were collected for UV-vis. The SWNT/DMF suspension shows much lower absorbance after centrifugation, likely due to higher re-aggregation and sedimentation of the nanotubes, resulting in lower SWNT concentration in the supernatant. The van Hove transitions in SWNT/PMMA/DMF were blue shifted 12-24 meV as compared to SWNT/DMF both before and after centrifugation. The van Hove transition energy of nanotubes redshift upon bundling. O'Connell, M. J., S. Sivaram, and S. K. Doorn, *Near-infrared resonance Raman excitation profile studies of single-walled carbon nanotube intertube interactions: A direct comparison of bundled and individually dispersed.* Physical Review B, 2004. 69(23): p. 235415. This indicates that the SWNT reaggregation starts immediately after stopping sonication. So the PMMA wrapping not only prevents nanotube aggregation and sedimentation, but the PMMA wrapped nanotubes are more exfoliated compared to the SWNT suspension.

Example 3

Monitoring Aggregation Using Raman Spectroscopy

In FIG. 11A the Raman spectra, using a 785 nm laser, shows higher intensity for (12,1), (10,5) and (9,7) and lower intensity for (10,2), (9,4) and (13,3) nanotubes for SWNT/PMMA compared to SWNT samples; at that laser energy the former three nanotubes are in resonance when individualized while the latter three are in resonance while bundled (O'Connell, M. J., S. Sivaram, and S. K. Doorn, *Near-infrared resonance Raman excitation profile studies of single-walled carbon nanotube intertube interactions: A direct comparison of bundled and individually dispersed.* Physical Review B, 2004. 69(23): p. 235415), showing the influence of polymer wrapping on individualizing the nanotubes. The Raman profile of the SWNT/PMMA sample is similar to that of SDS/SWNT, where the SDS surfactant is intended to exfoliate the bundled nanotubes. Mayo, M. L., D. Hogle, B. Yilmaz, M. E. Kose, and S. Kilina, *Morphology and dispersion of polycarbazole wrapped carbon nanotubes.* RSC Advances, 2013. 3(43): p. 20492-20502, Heller, D. A., P. W. Barone, J. P. Swanson, R. M. Mayrhofer, and M. S. Strano, *Using Raman Spectroscopy to Elucidate the Aggregation State of Single-Walled Carbon Nanotubes.* The Journal of Physical Chemistry B, 2004. 108(22): p. 6905-6909).

FIG. 11B shows that after removing the PMMA by heat treatment, the nanotube-nanotube interaction increases, causing a red-shift in the transition energy, hence a change in RBM intensities. The nanotubes are restricted in the buckypaper network and are not free to rebundle and pack as well as the as sonicated SWNT. The red-shift of E22 transition energy reverses the intensity of the peaks of the debundled SWNT/PMMA. Since the change in transition energy is not the same for all nanotubes, the intensities do not change proportionately. There is an upshift of ~2 cm-1 for all of the RBM frequencies in the SWNT/PMMA and SWNT samples compared to SWNT/PMMA-HT, which could be attributed to polymer wrapping (Bonhommeau, S., P. Deria, M. G. Glesner, D. Talaga, S. Najjar, C. Belin, L. Auneau, S. Trainini, M. J. Therien, and V. Rodriguez, *Raman Spectroscopic Investigation of Individual Single-Walled Carbon Nanotubes Helically Wrapped by Ionic, Semiconducting Polymers.* The Journal of Physical Chemistry C, 2013. 117(28): p. 14840-14849, Fantini, C., A. Jorio, A. P. Santos, V. S. T. Peressinotto, and M. A. Pimenta, *Characterization of DNA-wrapped carbon nanotubes by resonance Raman and optical absorption spectroscopies.* Chemical Physics Letters, 2007. 439(1-3): p. 138-142, Quan-Hong, Y., G. Nittaya, J. O. Claudio, L. Feng, V. Alun, S. Riichiro, S. N. Iris, T. Zhi-Yuan, C. Hui-Ming, B. Tom, and H. L. Wei, *A Raman probe for selective wrapping of single-walled carbon nanotubes by DNA.* Nanotechnology, 2007. 18(40): p. 405706) and bundling (Wonsuk, J., W. Ju Yeon, L. Seung Ho, K. Duckjong, K. Soohyun, and H. Chang-Soo, *Evaluation of the individualization state in single-walled carbon nanotube solutions using absorption, Raman and photoluminescence spectroscopy.* Measurement Science and Technology, 2012. 23(12): p. 125501, Kuzmany, H., W. Plank, M. Hulman, C. Kramberger, A. Gruneis, T. Pichler, H. Peterlik, H. Kataura, and Y. Achiba, *Determination of SWCNT diameters from the Raman response of the radial breathing mode.* Eur. Phys. J. B, 2001. 22(3): p. 307-320), respectively.

Additionally, SWNTs that have bandgaps close to the exciting laser energy are probed. The resonance energy of carbon nanotubes red shifts upon bundling, causing the nanotubes to go in resonance or off resonance based on their band gap energy relative to the laser energy, making it a beneficial tool to monitor bundling. O'Connell, M. J., S. Sivaram, and S. K. Doorn, *Near-infrared resonance Raman excitation profile studies of single-walled carbon nanotube intertube interactions: A direct comparison of bundled and*

*individually dispersed. Physical Review B,* 2004. 69(23): p. 235415; Heller, D. A., P. W. Barone, J. P. Swanson, R. M. Mayrhofer, and M. S. Strano, *Using Raman Spectroscopy to Elucidate the Aggregation State of Single-Walled Carbon Nanotubes.* The Journal of Physical Chemistry B, 2004. 108(22): p. 6905-6909.

Figure 12A:
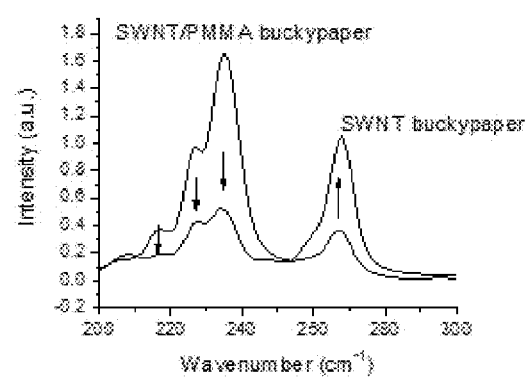
FIGS. 12A-B depict an exemplary embodiment showing Raman data of individual SWNTs.
Figure 12B:
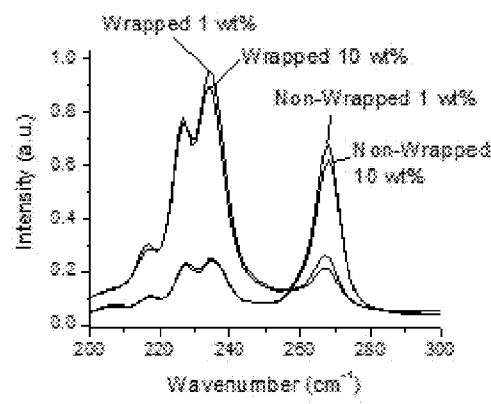

The Raman spectra of the wrapped SWNT films indicated debundled SWNTs from the radial breathing mode (RBM), while the RBM mode of the non-wrapped SWNTs indicates aggregated SWNTs, as shown in FIG. 12A. The arrows in FIG. 12A show the direction of intensity upon bundling. The RBM at 268 cm-1 corresponds to nanotube (10,2). Upon bundling (10,2) bandgap energy approaches the laser energy and the intensity of that RBM peak increases. The opposite happens for the three other RBM peaks as shown in FIG. 12B, because the band gap energies approach the laser energy when the SWNTs are individualized. Interestingly, all of the wrapped SWNT films and buckypapers followed this behavior, regardless of SWNT content, while the non-wrapped SWNTs in the films and buckypapers indicated aggregation. This confirms that the state of aggregation or bundling is independent of CNT loading.

Example 4

Testing for High Surface Area and Controlled Pore Size Useful for Energy Storage The surface area and pore size of nanomaterials can be measured using gas adsorption. To analyze the porosity, the sample is first degassed to remove all moisture from the porous structure. The sample is heated to 90° C. under vacuum and kept at that temperature for 16 hours to ensure complete removal of moisture. The sample tube is then backfilled with nitrogen gas. At this stage the sample is ready for analysis. In the beginning of the analysis, the sample tube is evacuated to very low pressures. Depending on the analysis gas and the bath temperature, different amounts of gas is admitted into sample tube to probe the material structure. When the adsorbate gas is nitrogen (N2) the bath temperature is maintained at 77 K. Nitrogen is admitted in incremental doses at different partial pressures up to the gas saturation pressure to probe the pore structure of the material. The amount of gas quantity adsorbed versus gas pressure is plotted to generate an adsorption isotherm, which can reveal the structure of the adsorbing material (called adsorbent) from the shape of isotherm. The classical adsorption theory assumes that the adsorbate first forms a monolayer on the surface before beginning to form a second layer. The surface area is calculated using the adsorbate molecule dimensions and the number of molecules admitted to the sample tube at increasing partial pressures.

The specific surface area (SSA) of the different buckypapers is presented in Table 1. FWNTs have lower SSA than SWNTs since the inner walls are not accessible. The SWNT sample exhibits an SSA of 600 m2/g, since the nanotubes can rebundle after sonication and reduce surface area. However, for the high surface area PMMA processed buckypapers, HS-SWNT, we obtained SSA as high as 1030 m2/g (average bundles of 4 SWNT from theoretical calculations). Measurements of 11 PMMA processed buckypapers yielded an average specific surface area of 943±69 m2/g. The increase of SSA for the PMMA processed SWNT buckypaper compared to the SWNT buckypaper confirms that the PMMA wrapping prevents the aggregation of the SWNTs, resulting in higher SSA after the PMMA is removed. The added pores are mainly micro and mesopore in size, from 1 to 11 nm pore width, as shown in FIGS. 13A-B. The additional surface area in the 1 nm region are likely due to the removed PMMA wrapping, resulting in micropores between adjacent nanotubes.

Figure 14A:
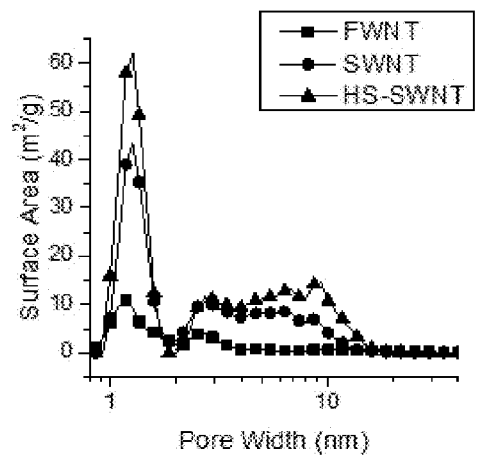
FIGS. 14A-B depict an exemplary embodiment of data showing high surface area and controlled pore size useful for energy storage.
Figure 14B:
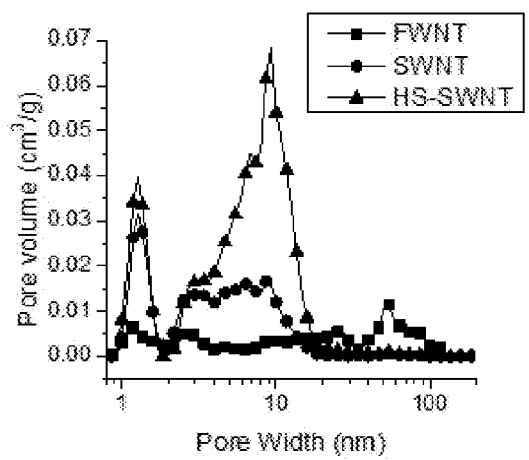

The buckypaper made from FWNT had the SSA of 300 m2/g, and the one made from SWNT without the aid of PMMA had the SSA of 650 m2/g. The highest surface area SWNT buckypaper obtained with the aid of PMMA, exhibited the surface area of 950 m2/g, and this buckypaper is denoted as HS-SWNT buckypaper. The SWNT has lower SSA than HS-SWNT, as in the absence of PMMA, nanotubes re-bundle after sonication. The increase of SSA for the PMMA processed SWNT buckypaper compared to the buckypaper without the use of PMMA, supports the hypothesis that PMMA wrapping results in smaller diameter SWNT bundles and hence higher specific surface area, after PMMA has been removed. HS-SWNT, not only shows higher surface area than SWNT and FWNT buckypapers, but it also shows higher pore volume (FIGS. 14A-B). The data presented in FIG. 14A shows that the higher surface area with smaller pore size. The data presented in FIG. 14B shows that the higher pore volume was mostly due to micro and mesopores, with sizes in the range of 1 to 11 nm.

Example 5

TGA, XRD, and Raman Spectroscopy and Elemental Analysis

All three PMMA dispersions (with SWNT, FWNT, and MWNTs) contained 91% PMMA with respect to the total weight of PMMA and CNT in DMF. However, based on the TGA study (FIG. 2) and the weight of the buckypaper after drying, it was estimated that the PMMA in FWNT/PMMA and MWNT/PMMA as produced buckypaper was 9% and 7%, respectively, while it was 37% in as produced SWNT/PMMA buckypaper. The remaining PMMA is filtered out with DMF during vacuum filtration. Higher PMMA weight retention in SWNT containing samples as compared to FWNT and MWNT containing samples suggested a specific interaction between PMMA and SWNT, and not between PMMA and FWNTs, and nor between PMMA and MWNTs.

The diffraction pattern of PMMA exhibits three amorphous peaks (FIG. 3A). The diffraction pattern of the FWNT/PMMA and MWNT/PMMA buckypapers is similar to their control buckypaper patterns as shown in FIG. 3B. Sonication of SWNTs and PMMA in DMF resulted in a stable suspension, which after filtering the solvent, displayed a sharp peak at 0.83 nm (FIG. 4A). When the X-ray beam (Z-direction) was perpendicular to the buckypaper plane (XY plane), the diffraction pattern was isotropic, as expected. However, when the X-ray beam (Z-direction) was parallel to the plane of the buckypaper (XY plane), then the diffraction pattern exhibited anisotropy (FIG. 4B). The new strong intensity peak at 0.83 nm appeared on the meridian, which suggested that the feature giving rise to this peak is oriented along the CNT axis. After burning out the PMMA at 400° C. in the presence of nitrogen, the sharp peak disappeared and the resulting diffraction pattern was similar to that of the control SWNT buckypaper processed without PMMA.

The 0.83 nm peak was observed regardless of the PMMA molecular weight (FIG. 5A). Three different molecular weight PMMA samples were used. The 0.83 nm peak intensity increases with molecular weight, while the PMMA content in all three buckypapers prepared via filtration was comparable at ~37%. In contrast to filtration, where approximately 95% of the PMMA is filtered out with the solvent for the PMMA/SWNT buckypaper, when the solvent is removed via evaporation, all the PMMA remains in the buckypaper. Thus, the SWNT/PMMA buckypaper prepared by evaporation results in almost 20 times more PMMA than the buckypaper prepared by filtration. The SWNT/PMMA buckypaper prepared by evaporation still shows 0.83 nm ordered PMMA peak. However, this peak is almost dwarfed by the amorphous PMMA peak (FIG. 5B).

Polymer wrapping also takes place in other polar organic solvents such as dimethyl sulfoxide (DMSO) and nitromethane. When DMSO was used the intensity of the shark peak was smaller and shifted from 2θ=10.8° to 11.2°, corresponding to a d-spacing of 0.79 nm (FIG. 6). The PMMA wrapped SWNTs do not disperse in DMSO. Instead, aggregates are formed. This may be due to the interaction between the methyl-methacrylate functional groups on SWNT surfaces with the solvent.

The new peak was also observed when nitromethane, which is also a good solvent for both PMMA and SWNTs, was used instead of DMF. Since unpurified SWNTs were used, the diffraction pattern was swamped by the metallic impurities. Despite the strong baseline intensity from the impurities, the peak at ~10.8° was still visible in the buckypaper XRD (FIG. 7).

Example 6

Helical Model Validation

FIG. 8 shows helical wrapping of PMMA in the SWNT/PMMA interaction. PMMA wraps neatly around SWNTs and the sharp peak in the XRD corresponds to the distance between pendant groups along the nanotube axis. From energy minimization of PMMA chains in trans configuration, the C—C—C bond angle in the backbone is ~107°, when methyl methacrylate (MMA) is on the central carbon, and ~123°, for the other carbon. The model was initiated with these C—C—C bond angles. The dihedral angle was chosen to match the helical pitch of 0.83 nm. The tacticity was achieved by assigning the methacrylate group to the left or right side based on a randomly generated binary vector. Each complete helical revolution consists of 21 to 22 monomers, with a diameter of ~1.6 nm, creating a hole sized for smaller nanotubes. Energy minimization (using Chembio3D molecular dynamics simulation) was carried out on the initial chain model.

Enthalpy driven CH-π interactions are possibly the main drive for the wrapping, resulting in lower energy. The existence of CH-π interactions has been known for a long time. The strength of the CH-π is one tenth of hydrogen bonding but multiple CH-π interactions along the polymer chain length between the CH2 and the π bonds can add up to make the helical wrapping energetically favorable. If the SWNT structure does not change significantly after removing the PMMA as a first order approximate, the diffraction pattern of the PMMA in the SWNT/PMMA buckypaper can be obtained by subtracting the diffraction pattern of SWNT from SWNT/PMMA as shown in FIG. 9A. The diffraction pattern of the energy minimized helical model was obtained using Debyer and is shown in FIG. 9B, which is similar to the diffraction pattern of the ordered PMMA.

Energy minimization (using Chembio3D molecular dynamics simulation) was carried out on the initial chain model shown in FIG. 23A, and the minimum energy configuration is shown in FIG. 23B. After this energy minimization, chain was heated to 400 K, and the energy minimization process was again carried out. The resulting random coil configuration is shown in FIG. 23C. The total energy of the PMMA went from 77670, to 2980, and subsequently to 2890 kcal/mol, showing that the energy for the helical configuration is slightly higher than that of the random coiled state.

Example 7

Observations of SWNT Debundling

Figure 15A:
FIGS. 15A-C depict an exemplary embodiment of data showing SWNT debundling.
Figure 15B:
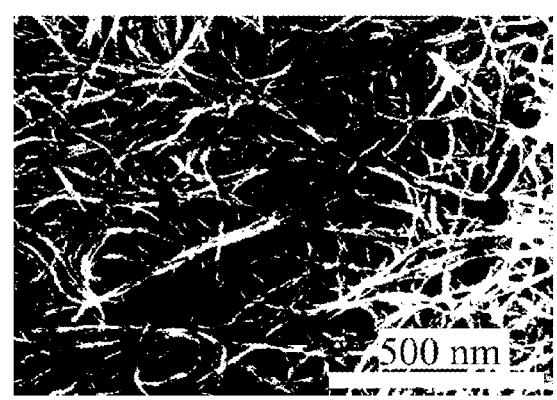
Figure 15C:
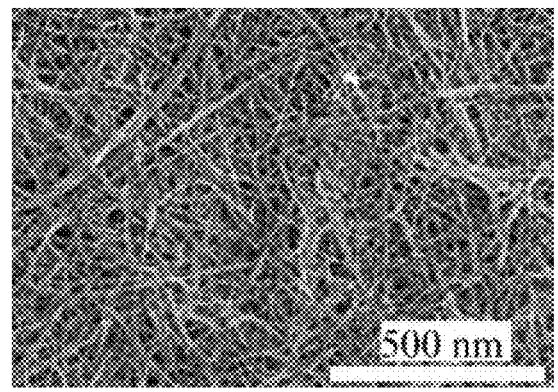

FIGS. 15A, 15B, and 15C show SEM images of the three buckypaper (FWNT, SWNT, and HS-SWNT, respectively) surfaces. The average CNT bundle diameters for FWNT, SWNT and HS-SWNT buckypapers measured from these images, using ImageJ software, are 22±10 nm, 9±4 nm, and 3±2 nm respectively. These bundle diameters are qualitatively consistent with the surface area values measured from the nitrogen gas adsorption. In other words, as expected, buckypapers with low surface area have large bundle diameter and vice-versa.

Example 8

Observations of High Energy Storage Capability of PMMA-Wrapped SWNT

FIGS. 16A-B show the specific capacitance and energy density values for three different types of electrodes (FWNT, SWNT, and HS-SWNT) in KOH electrolyte. FIG. 16A shows specific capacitance as a function of current density. FIG. 16B shows energy density as a function of current density.

The capacitance and energy density decrease with increasing current densities. The energy density was calculated directly from current, voltage and discharge time, rather than from capacitance (E=½CV$^2$), as sometimes done. Thermogravimetric analysis in the previous chapter confirmed that PMMA is completely removed under the heat treatment conditions used for HS-SWNT processing, and there is no degradation and/or functionalization of SWNT. Presence of any amorphous carbon or SWNT functionalization would have resulted in a decreased G/D ratio, but this has not been observed. The C/O ratio in both SWNT and HS-SWNT buckypapers is also the same. This confirms that the enhanced energy storage of HS-SWNT was only due to its higher surface area as compared to SWNT.

For EDLCs, if the entire surface area is accessible, then capacitance should increase linearly with SSA. PMMA processing of SWNTs repeatedly produced buckypapers with specific surface area above 900 m2/g. Measurements of 11 PMMA processed buckypapers yielded an average specific surface area of 943±69 m2/g. Two trials using PMMA, resulted in buckypapers with surface areas of 805 and 870 m2/g, and these were also tested for their performance as supercapacitor electrode. Thus in total five electrodes were tested with surface area in the range of 300 to 950 m2/g, and their specific capacitance as a function of specific surface area are plotted at 5 and 100 mV/s, showing reasonable correlation within experimental error.

The HS-SWNT electrode was also tested using ionic liquid electrolyte, EMIMBF4. Ionic liquids enable storage of more energy due to their higher operating potential window, since stored energy scales with square of voltage, E∝V$^2$. The Ragone plots of the HS-SWNT electrodes based on ionic liquid and KOH electrolyte tests are given in FIG. 17. As expected, due to large potential window, the energy density is ~9 times higher using the ionic liquid electrolyte than 6 molar KOH electrolyte.

Packaging and size of the energy storage device are also important factors. If the volumetric capacitance is too low, then a large electrode volume will be required for storing certain amount of charge. This may not always be practical. Therefore, along with high gravimetric capacitance, a high electrode density is often required. The Density of the HS-SWNT film was 0.63±0.02 g/cm3. Since supercapaci-

TABLE 3

Tensile properties of buckypapers of SWNT and SWNT/PMMA (65 wt %/35 wt %) buckypapers.

| Buckypaper | Modulus (GPa) | Tensile Strength (MPa) | Elongation at break (%) |
|---|---|---|---|
| SWNT | 1.1 ± 0.2 | 16 ± 3 | 1.8 ± 0.9 |
| SWNT/PMMA | 6.5 ± 0.4 | 59 ± 12 | 1.4 ± 0.5 |

TABLE 4

Tensile properties and G' band shift of PMMA/SWNT films

| SWNT content | Modulus (GPa) | | Tensile Strength (MPa) | | Elongation at break (%) | |
|---|---|---|---|---|---|---|
| | wrapped* | non-wrapped | wrapped | non-wrapped | wrapped | non-wrapped |
| 0% (PMMA) | 1.6 ± 0.1 | | 54 ± 10 | | 8.4 ± 3 | |
| 0.1%* | 1.8 ± 0.2 | — | 47 ± 3 | — | 9.7 ± 1.8 | — |
| 1% | 2.1 ± 0.2 | 1.2 ± 0.1 | 60 ± 3 | 30 ± 6 | 9.6 ± 2.2 | 3.4 ± 0.9 |
| 5% | 2.5 ± 0.2 | 1.9 ± 0.1 | 54 ± 2 | 46 ± 8 | 5.3 ± 0.4 | 5.2 ± 1.2 |
| 10% | 3.2 ± 0.4 | 2.6 ± 0.3 | 48 ± 8 | 47 ± 7 | 1.9 ± 0.3 | 2.6 ± 0.7 |

*Purified SWNTs
*Wrapped: samples prepared with PMMA wrapping on CNT. Non-wrapped: samples prepared with no PMMA wrapping.

tors are primarily used for high power applications, the HS-SWNT provides great performance.

Figure 18:
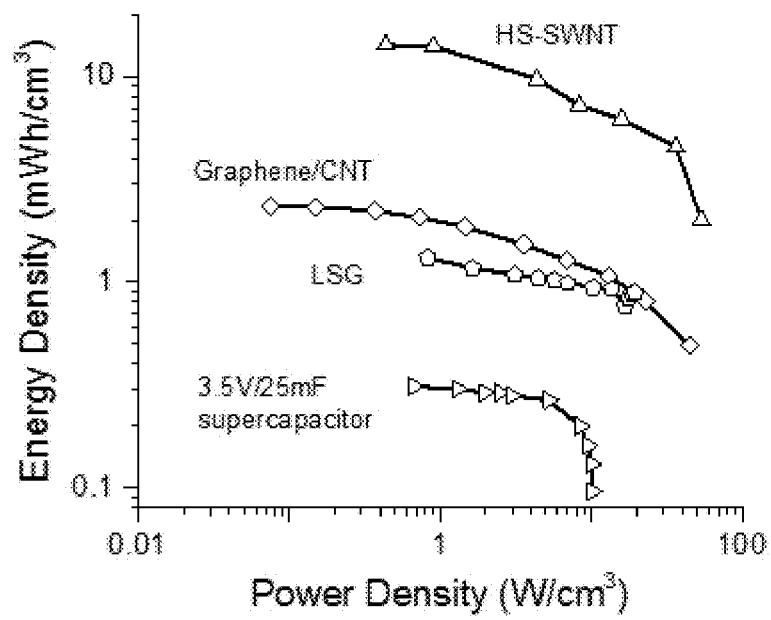
FIG. 18 depicts an exemplary embodiment of data showing high energy storage capability.

In order to demonstrate the performance of the HS-SWNT, a Ragone plot is presented in FIG. 18, comparing the performance of HS-SWNT with recent literature data on SWNT and graphene electrodes. This includes a commercial 3.5 V/25 mF activated carbon supercapacitor, CNT/graphene and laser scribed graphene electrodes. The volumetric energy density of the HS-SWNT electrode is about 2 mWh/cm3 at the very high power density of 54 W/cm3, and about 14 mWh/cm3 at low power density.

Example 9

Effect of PMMA Wrapping on the Mechanical Properties in Nanocomposites

As shown in Table 3, PMMA wrapping, which consisted ~35 wt % of the SWNT/PMMA buckypaper, resulted in better mechanical properties in buckypapers. The modulus and tensile strength of the SWNT/PMMA buckypaper was 5.9 and 3.7 times that of the SWNT buckypaper, respectively. The tensile properties of the wrapped SWNT films were generally better than the non-wrapped films as shown in Table 4. The non-wrapped 1 wt % film had lower mechanical properties compared to the PMMA film due to visible inhomogeneities (Table 3). The large mismatch between the stiffness of CNT rich areas compared to parts of the composite with less CNTs leads to larger deformation in parts of the composite with lower stiffness. This simply means that the effective cross section of deformation is smaller in a non-homogeneous structure. This causes an earlier onset of failure and lower tensile properties, which could explain the lower modulus and strength of 1 wt % non-wrapped SWNT film.

While the SWNTs in the non-wrapped 5 and 10 wt % SWNT film are aggregated on a nanoscale similar to the aggregates formed in the 0.1 and 1 wt % non-wrapped SWNT films, the films are completely opaque with no PMMA rich regions visible. For the PMMA wrapped films, tensile strength peaks at 1% SWNT and decreases at higher SWNT loadings. For the non-wrapped SWNT films, tensile strength is reduced by 45 percent at 1 wt % SWNT and increases at higher SWNT loadings but remains below the strength of neat PMMA film. The 1 wt % non-wrapped film has very low tensile properties due to its inhomogeneity coupled with the impurities. The high impurity of the SWNTs (35 wt %) may be the main reason of the reduction of tensile strength and elongation at break. The impurities which are ~4 nm, can be detrimental to the structure.

Example 10

Effect of PMMA Wrapping on Stress Transfer to SWNTs

Figure 19:
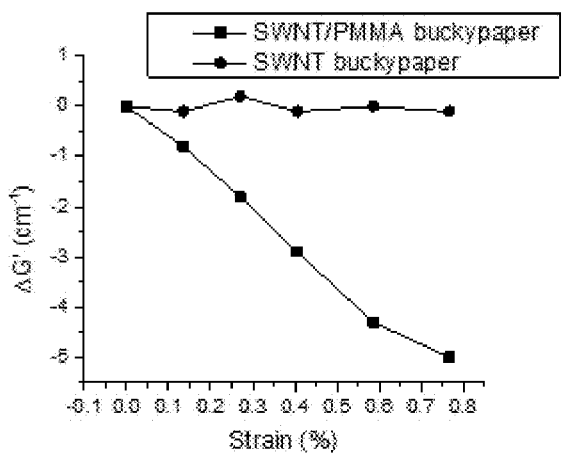
FIG. 19 depicts an exemplary embodiment of data showing load transfer via PMMA wrapping.

By monitoring the G' band shift during straining of the buckypapers, as shown in FIG. 19, no significant change in G' band position of the SWNT buckypaper was observed. The stress is transferred through van der Waals interaction between the nanotubes in the buckypaper. In addition to the RBM Raman intensities, surface area measurements indicate larger bundles in the SWNT buckypaper compared to the SWNT/PMMA buckypaper. This means that for the same amount of nanotubes there are fewer bundles and fewer discrete contact points in SWNT buckypaper compared to SWNT/PMMA buckypaper. The weakest component fails upon straining the buckypaper. In this case, slippage occurs at the nanotube-nanotube interface. Slippage is unlikely to occur between nanotubes in a bundle since the continuous nanotube interface between nanotubes in a bundle is much larger than discrete contact points, resulting in slippage occurring at CNT cross over points. To delay the onset of slipping, discrete contact points should be maximized, which can be achieved by complete individualization of the CNTs. When SWNT/PMMA buckypaper is strained, stress is transferred through the many crossover points in the entangled structure to individual SWNTs. This allows sufficient stress to be transferred to the nanotubes to induce measurable G' Raman band shift. However, when there are fewer crossover points, the bundles slip before adequate stress is experienced by the CNTs in the bundle, resulting in negligible G' Raman band shift.

To measure the strain/stress of the nanotubes irrespective of the slippage that is occurring, the G' Raman band shift rate of individual semiconducting SWNTs of 37.3 cm-1/% strain is used. This value has been determined by straining individual SWNTs using atomic force microscopy and measuring the G' Raman band shift. The strain experienced by individual nanotubes can be expressed as $\varepsilon_i = S_m/37.3\%$, where Sm is the maximum G' band shift. For the SWNT/PMMA buckypaper when the buckypaper is strained at 0.77%, $S_m=5$ cm-1 (FIG. 19), so the strain on individual tubes is $\varepsilon_i=0.14\%$ (corresponds to σi=1.06 GPa, considering SWNT modulus 760 GPa. The rest of the strain comes from slipping of the nanotubes and straightening out of the curvatures.

Figures 22A, 22B:
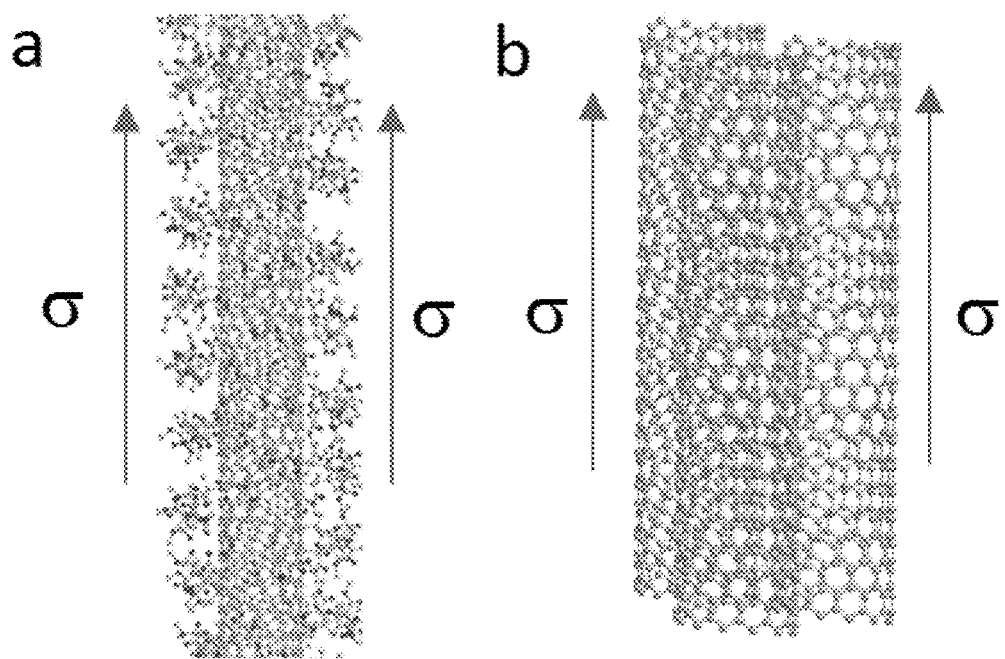
FIGS. 22A-B depict an exemplary embodiment showing how PMMA wrapping will be effective in stress transfer.

The maximum G' Raman band shift is larger in the composite films compared to the buckypapers. This difference can be explained by distinguishing how stress is transferred to the nanotubes in the composite and the buckypapers. FIG. 22A shows stress transfer from the matrix to individual SWNT wrapped with PMMA. FIG. 22B shows stress transfer from the matrix to SWNT bundles. In the films, as shown in FIGS. 22A-B, stress is transferred through the continuous PMMA-SWNT interface along the whole length of the nanotube.

Figure 20:
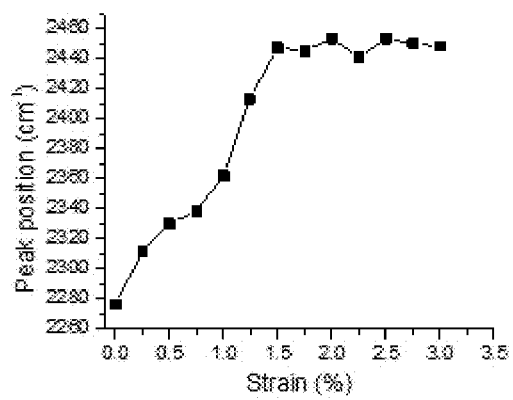
FIG. 20 depicts an exemplary embodiment of data showing load transfer via PMMA wrapping.
Figure 21:
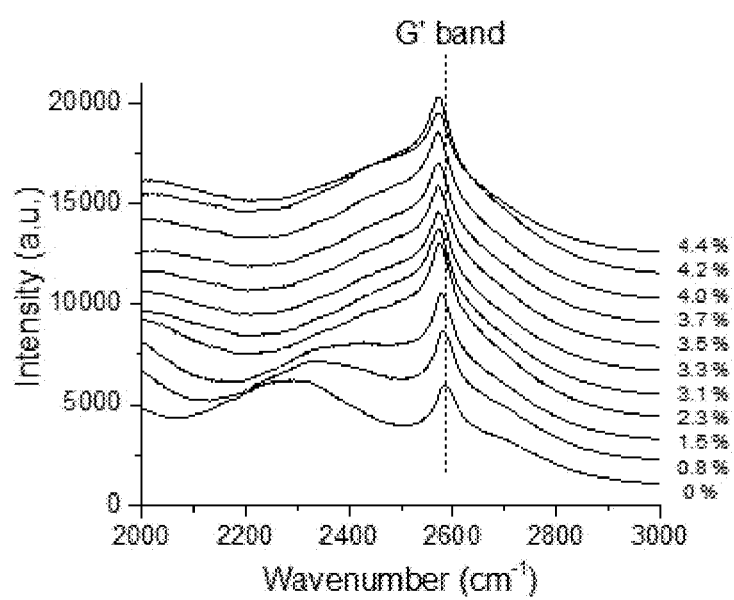
FIG. 21 depicts an exemplary embodiment of data showing change in Raman spectra due to PMMA wrapping and the effect of stress on the same.

FIG. 21 shows raman spectra of 1 wt % wrapped PMMA/SWNT film at different strains. Plots were shifted vertically for clarity. Vertical dotted line indicates position of G' band at 0% strain. From these observations there seems to be an interaction between amorphous and helical PMMA leading to the new peak. When the film is strained the new peak at 2276 cm$^{-1}$ upshifts (FIG. 21) and the peak shift plateaus at 1.5% strain as shown in (FIG. 20).

As various changes can be made in the above-described subject matter without departing from the scope and spirit of the present invention, it is intended that all subject matter contained in the above description, or defined in the appended claims, be interpreted as descriptive and illustrative of the present invention. Many modifications and variations of the present invention are possible in light of the above teachings. Accordingly, the present description is intended to embrace all such alternatives, modifications, and variances which fall within the scope of the appended claims.

All patents, applications, publications, test methods, literature, and other materials cited herein are hereby incorporated by reference in their entirety as if physically present in this specification.

We claim:

1. A carbon nanotube composite comprising:
   a single wall carbon nanotube wrapped with poly (methyl methacrylate) (PMMA);
   wherein the PMMA is atactic; and
   wherein the PMMA is wrapped on the carbon nanotube as an ordered helix.

2. A film comprising the carbon nanotube composite of claim 1.

3. A fiber comprising the carbon nanotube composite of claim 1.

4. A suspension comprising:
   a liquid; and
   PMMA-wrapped single wall carbon nanotubes;
   wherein the PMMA is atactic; and
   wherein the PMMA is wrapped on the single wall carbon nanotubes as an ordered helix.

5. The suspension of claim 4, wherein the liquid is DMF.

6. A buckypaper prepared by a process of removing the PMMA from the composite of claim 1;
   wherein the buckypaper has a surface area of about 750 m$^2$/g to 1030 m$^2$/g.

7. A buckypaper prepared by heat treating the composite of claim 1 to remove the PMMA, wherein the buckypaper has a surface area of about 750 m$^2$/g to 1030 m$^2$/g.

8. A buckypaper comprising single wall carbon nanotubes wrapped with atactic poly (methyl methacrylate) (PMMA) as an ordered helix.

9. A buckypaper prepared by a process of removing the PMMA from the buckypaper of claim 8, having a surface area of about 750 m$^2$/g to 1030 m$^2$/g.

10. A buckypaper prepared by a process of removing the PMMA from the buckypaper of claim 8, having a surface area of about 900 m$^2$/g to 1030 m$^2$/g.

11. A buckypaper prepared by heat treating the buckypaper of claim 8 to remove the PMMA, wherein the buckypaper has a surface area of about 750 m$^2$/g to 1030 m$^2$/g.

12. A method of preparing a buckypaper of single wall carbon nanotubes comprising:
   suspending carbon nanotubes in a solvent to form a homogenized carbon nanotube/solvent suspension;
   adding atactic PMMA to the homogenized carbon nanotube/solvent suspension to form a PMMA/carbon nanotube/solvent suspension;
   sonicating the PMMA/carbon nanotube/solvent suspension;
   filtering the sonicated suspension; and
   washing and drying the filtrate to produce the buckypaper of single wall carbon nanotubes.

13. The method of claim 12 further comprising removing the PMMA from the produced buckypaper.

14. The method of claim 12 further comprising heat treating the produced buckypaper to remove the PMMA.

15. The method of claim 12, wherein the PMMA is wrapped on the carbon nanotubes as an ordered helix.

16. The method of claim 12, wherein the solvent is dimethylformamide (DMF).

17. The method of claim 12, wherein the PMMA concentration in the PMMA/carbon nanotube/solvent suspension is below the critical overlap concentration.

18. The method of claim 12, wherein washing and drying the filtrate comprises washing and drying the filtrate to produce the buckypaper of single wall carbon nanotubes having a surface area of about 750 m$^2$/g to 1030 m$^2$/g.

19. The method of claim 12, wherein washing and drying the filtrate comprises washing and drying the filtrate to produce the buckypaper of single wall carbon nanotubes having a surface area of about 900 m$^2$/g to 1030 m$^2$/g.

* * * * *